July 25, 1944.　　　　L. O. CARLSEN ET AL　　　　2,354,181
MACHINE FOR PRODUCING GEARS
Filed June 9, 1941　　　22 Sheets-Sheet 1

Inventor
LEONARD O. CARLSEN
AND
OLAF A. JOHNSON
By
　　　　　　Attorney

July 25, 1944.   L. O. CARLSEN ET AL   2,354,181
MACHINE FOR PRODUCING GEARS
Filed June 9, 1941   22 Sheets-Sheet 2

Inventor
LEONARD O. CARLSEN
AND
OLAF A. JOHNSON
By
Attorney

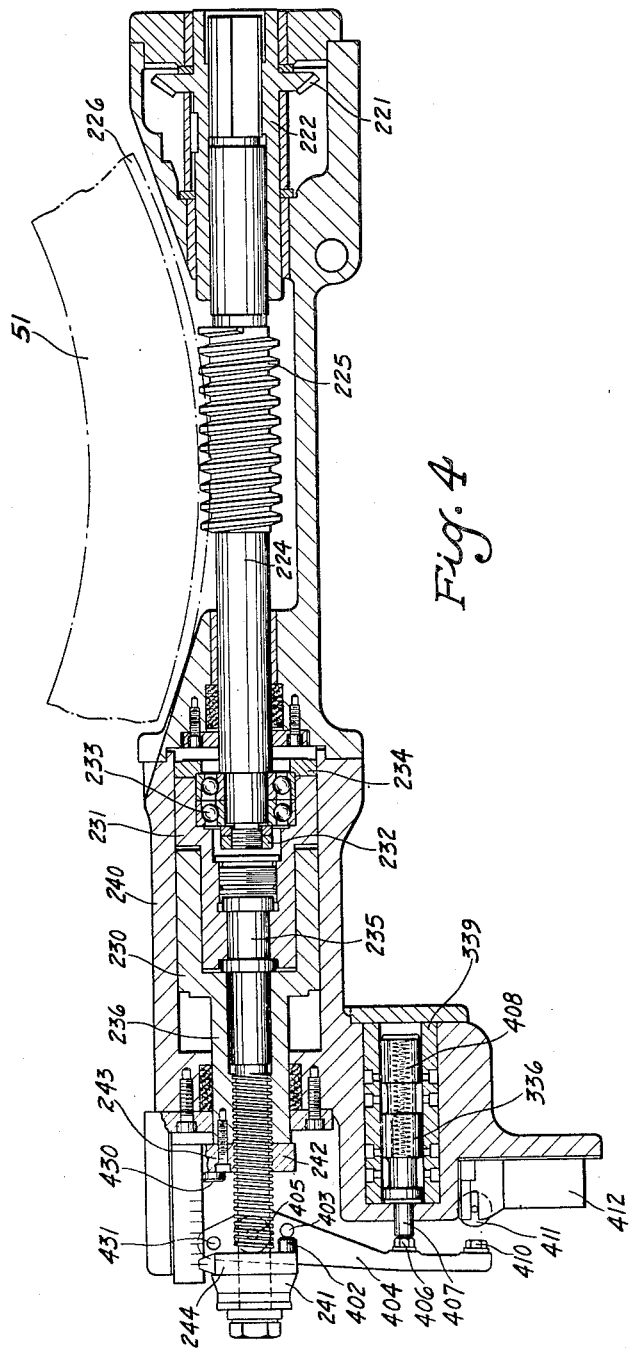

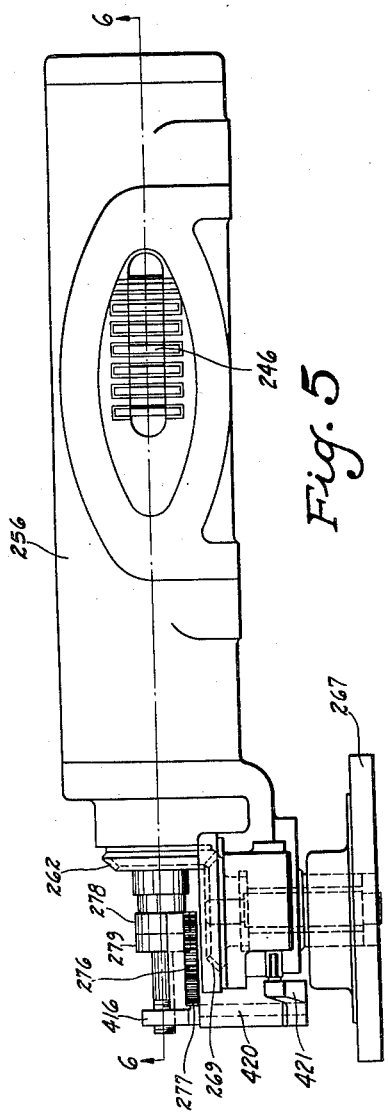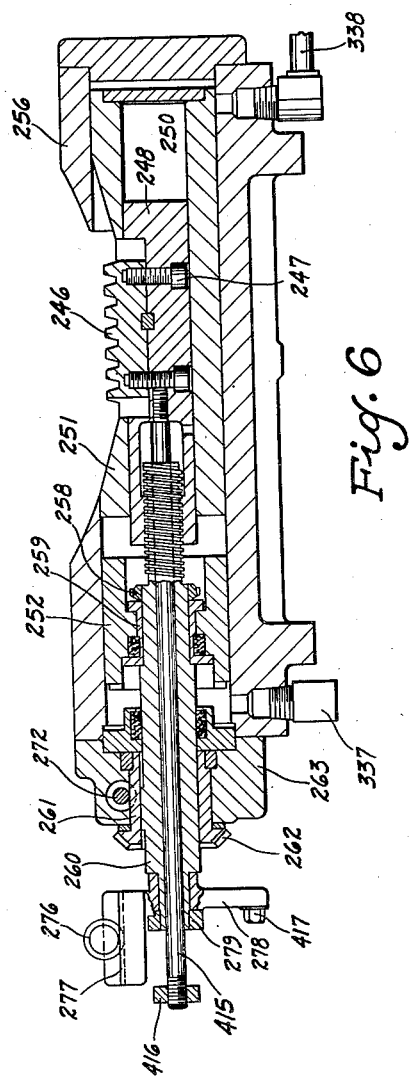

July 25, 1944.   L. O. CARLSEN ET AL   2,354,181
MACHINE FOR PRODUCING GEARS
Filed June 9, 1941   22 Sheets-Sheet 7

Inventor
LEONARD O. CARLSEN
AND
OLAF A. JOHNSON
By
B. Schlesinger
Attorney

July 25, 1944.   L. O. CARLSEN ET AL   2,354,181
MACHINE FOR PRODUCING GEARS
Filed June 9, 1941    22 Sheets-Sheet 9

Inventor
LEONARD O. CARLSEN
AND
OLAF A. JOHNSON

By

Schlesinger
Attorney

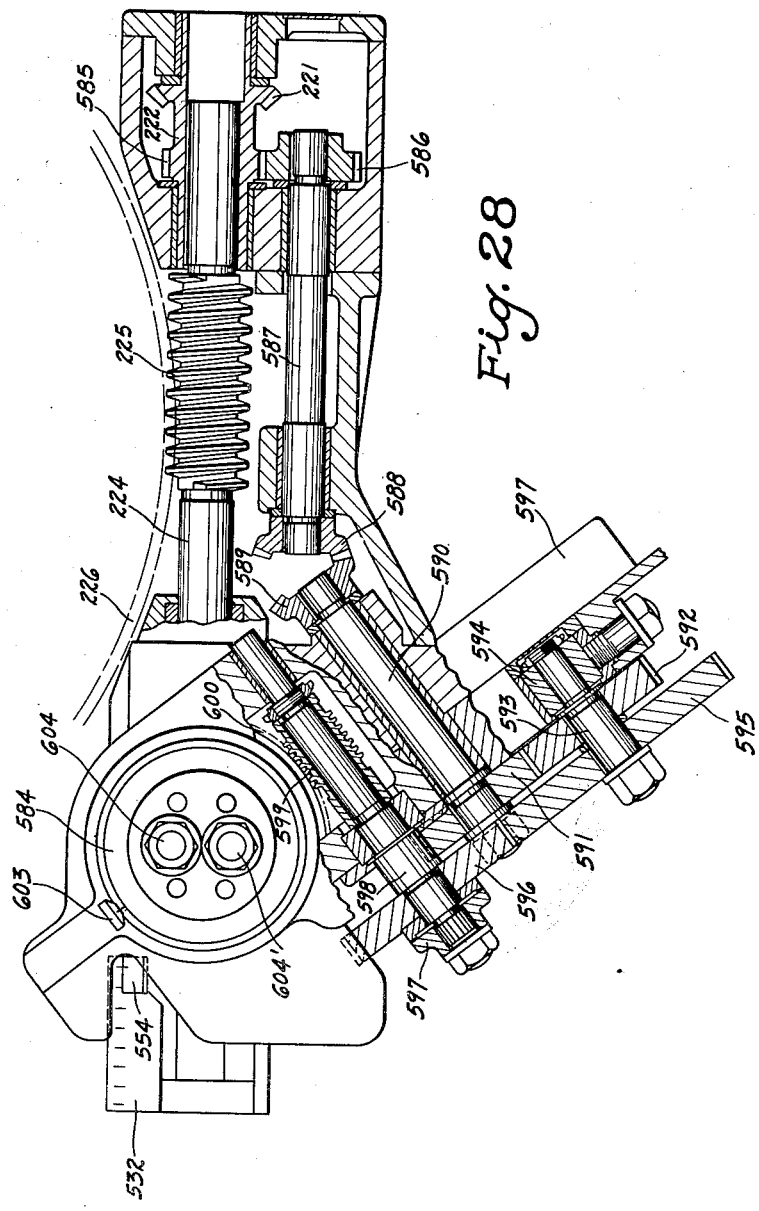

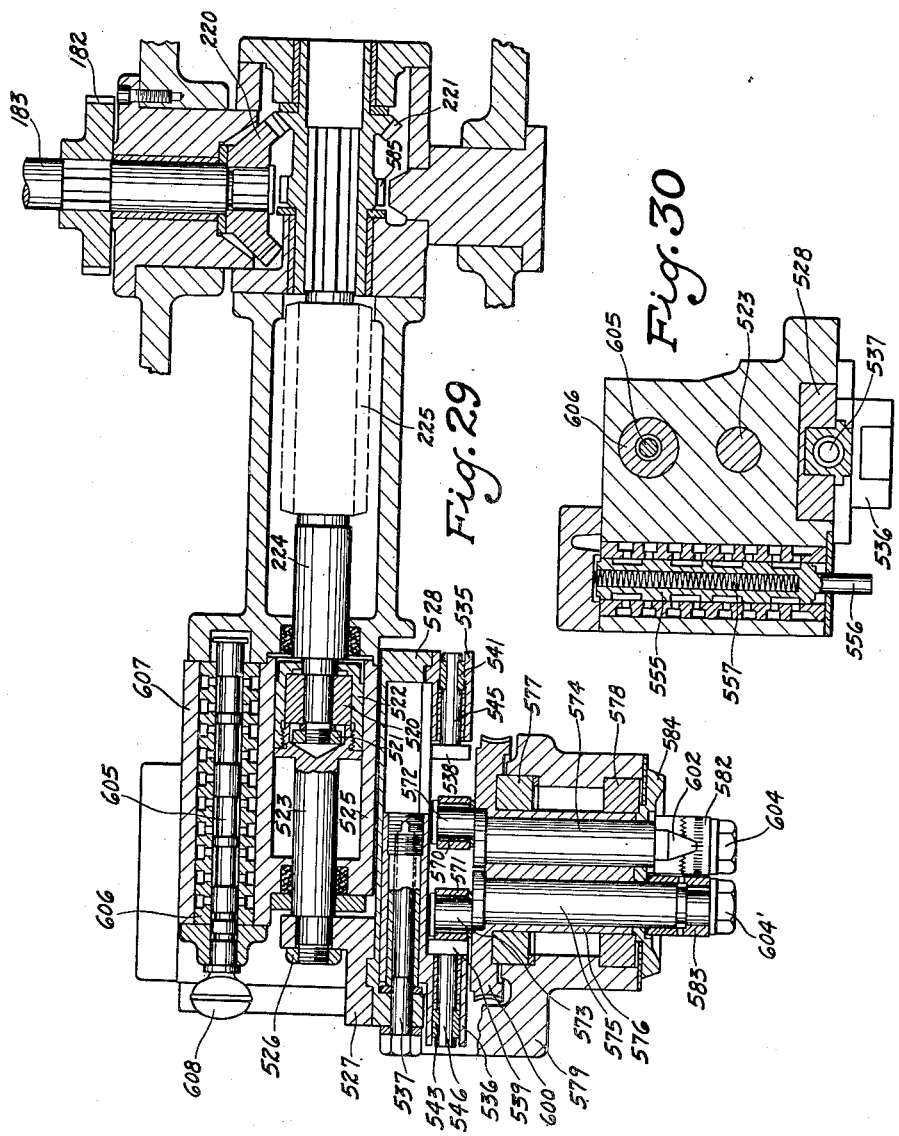

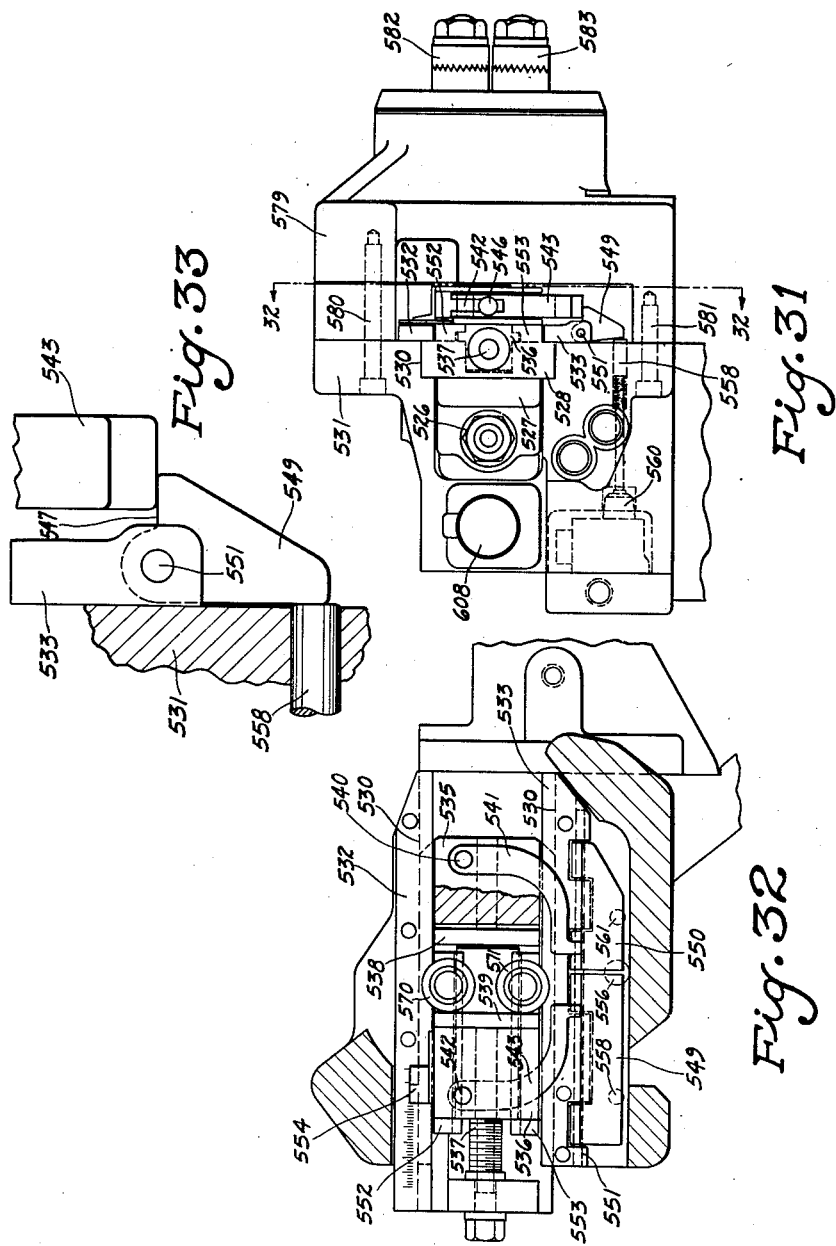

July 25, 1944.  L. O. CARLSEN ET AL  2,354,181
MACHINE FOR PRODUCING GEARS
Filed June 9, 1941   22 Sheets-Sheet 21

Inventor
LEONARD O. CARLSEN
AND
OLAF A. JOHNSON
By
Attorney

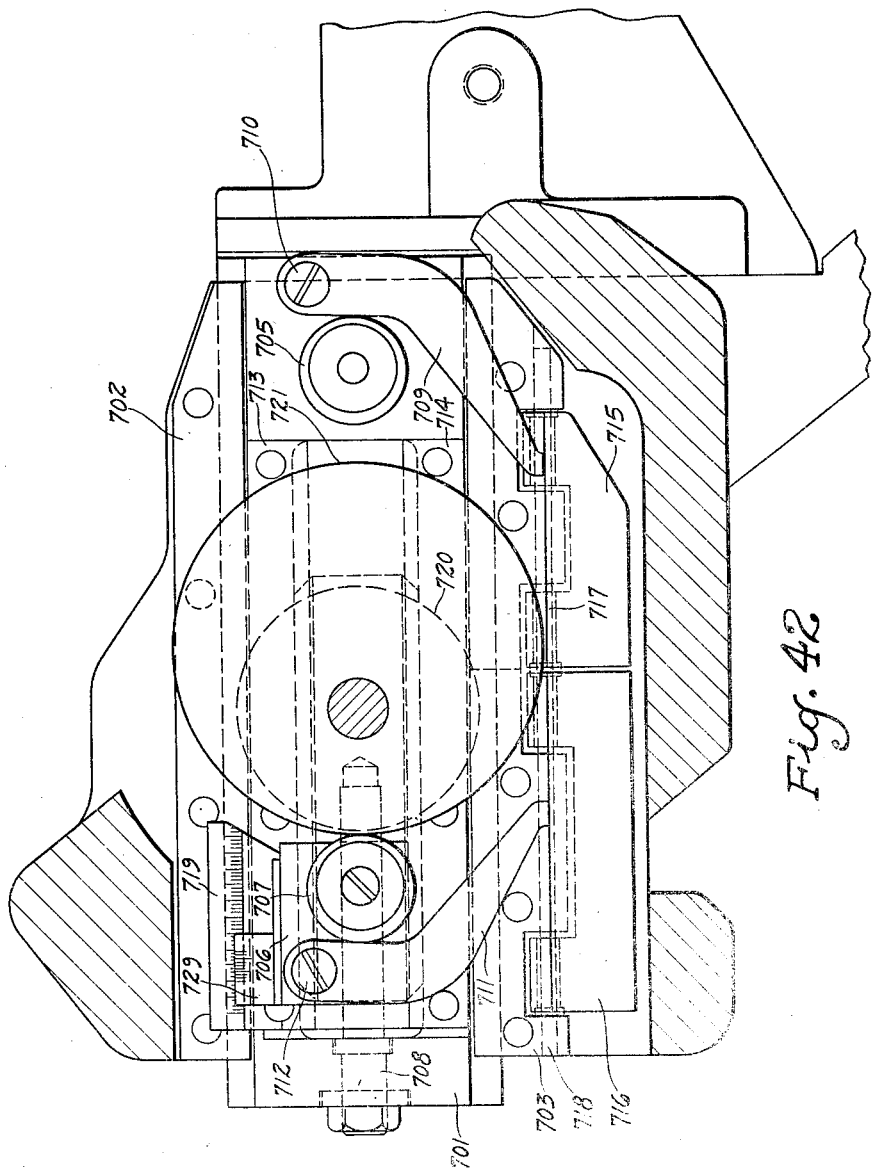

Patented July 25, 1944

2,354,181

UNITED STATES PATENT OFFICE 2,354,181

MACHINE FOR PRODUCING GEARS

Leonard O. Carlsen, Rochester, and Olaf A. Johnson, Irondequoit, N. Y., assignors to Gleason Works, Rochester, N. Y., a corporation of New York Application June 9, 1941, Serial No. 397,196

22 Claims. (Cl. 90—5)

The present invention relates to machines for producing gears and particularly to machines for generating longitudinally curved tooth gears such as spiral bevel and hypoid gears with a face-mill type of gear cutter.

Until very recent years, it has been the almost universal practice to rough-cut the tooth spaces of spiral bevel and hypoid gears and pinions with a face-mill gear cutter that has opposite side-cutting edges and cuts both sides of each tooth slot simultaneously. This is a very fast roughing process but the tooth spaces so roughed are of uniform width from end to end and have their opposite sides curved longitudinally about a common center, the axis of the cutter. The tooth spaces of the gear or larger member of the pair are ordinarily finish-cut, two sides simultaneously from the same center, so that the described roughing process produces roughed tooth slots in the gear which can very readily be cleaned up in the finishing operation. The opposite sides of the tooth spaces of the pinion must be finish-cut, however, from different centers. Otherwise, the radius of lengthwise curvature of the convex side of a tooth space of the pinion will not match properly the radius of lengthwise curvature of the concave side of a tooth of the mating gear, and vice versa. Otherwise, too, it will be impossible to obtain tooth spaces of longitudinally tapering width on the pinion to mesh with the longitudinally tapering teeth of the mate gear.

Where the tooth spaces of the pinion are rough-cut two sides simultaneously, therefore, a considerable burden is put on the pinion finishing cutters. They have to remove relatively large amounts of stock, especially at the large ends of the tooth spaces, to produce the desired taper and lengthwise curvature, and this slows up the finishing operation and moreover, at times, also affects the quality of the finish-cut.

Different attempts have been made, therefore, to rough-cut spiral bevel and hypoid pinions closer to finished size by roughing them with tooth slots tapering in width from end to end.

In one such attempt, a machine has been built in which two face-mill cutters are employed. These cutters are mounted eccentrically of one another and are arranged to operate simultaneously in two different tooth slots of the blank. One cutter roughs out the tooth slots of the blank to uniform width from end to end and the other subsequently recuts one side of each slot, producing the desired taper in width from end to end. This machine has proved quite successful and has gone into widespread use, but it has the disadvantage of requiring two cutters and, moreover, is not as simple or as universal as a single cutter machine.

In another attempt at taper-roughing spiral bevel and hypoid pinions, a roughing machine was built which was designed to rough-cut one side of a tooth space of the gear blank during generating roll in one direction and the other side of the tooth space during the return roll. In this machine, the cutter was shifted relative to the gear blank at the end of the roll in one direction and cut from a different center on the return roll than on the forward roll. Thus the slot, which was cut on the forward roll, was widened out and taper-cut on the return roll. This attempt was successful but involved considerable complications in the machine design and for that reason has never come into extensive use.

In the co-pending application of Ernest Wildhaber, Serial No. 324,827, filed March 19, 1940, there is disclosed a still further method of taper-cutting the tooth spaces of spiral bevel and hypoid pinions. In this method a single face-mill gear cutter is used. This cutter cuts in the same tooth space on both the forward and return generating rolls, but forward and return generating movements are effected at different ratios of roll, respectively. It is as though the pinion were rolling with one basic gear represented by the cutter during the uproll and with a different basic gear represented by the cutter during the return roll. The differences in the two basic gears are slight but sufficient to produce the desired lengthwise taper in width and lengthwise curvature of the tooth spaces of the pinion.

One object of the present invention is to provide a machine of improved construction in which a single face-mill gear cutter may be employed to taper-cut the tooth spaces of spiral bevel and hypoid pinions.

Another object of the present invention is to provide a machine of improved construction for taper-cutting spiral bevel and hypoid pinions in which the cutter may be shifted between the forward and return rolls to cut from a different center on the return roll from that from which it cuts on the forward roll.

A further object of the invention is to provide a machine of simple construction for taper-cutting pinions according to the process of the Wildhaber application above mentioned where taper cutting is effected by using different ratios of roll during the forward and return movements.

Still another object of the invention is to provide a machine of universal character for taper-cutting spiral bevel and hypoid pinions in which both shift of cutter position and change in ratio of roll may be employed so that longitudinally curved tooth pinions of zero or any spiral angle may be rough-cut.

A further object of the invention is to provide a machine of the class described in which gears and pinions may not only be taper-cut but in which variation in ratio of roll during both forward and return generating movements may be effected so as to cut tooth profiles modified from true involute shape.

Still another object of the invention is to provide a machine on which gears and pinions for transmitting non-uniform motion may be taper-cut.

A further object of the invention is to provide a machine in which change in position of the cutter for taper-cutting is effected by shift of the cutter carrier and generating cradle at the ends of the roll and in which the mechanism for shifting the position of the cradle is interlocked with the mechanism for shifting the position of the carrier, and safety devices are provided so that the return roll of the cradle can not begin until the shifting operation has been completed.

Other objects of the invention will be apparent hereinafter from the specification and from the recital of the appended claims.

In machines built according to the present invention, the roughing-cut is effected in a generating operation. Cutter and blank are rolled relative to one another first in one direction and then in the other, one side of a tooth space being generated during the forward roll and the opposite side being generated during the return roll. The cutter is then withdrawn from engagement with the blank and the blank is indexed. Then the cutter is fed back into engagement with the blank and the roll begins anew to cut a new tooth space of the blank.

The machine of the present invention may be embodied in various forms. For rough-cutting pinions of large size, it may be built simply with mechanism for changing the position of the cutter relative to the gear blank at the ends of the roll. For smaller size gears, the machine may be provided in addition with means for varying the ratio of roll different amounts during roll in opposite directions. With a machine of this latter construction, it is possible to taper-cut either by change of cutter position at the ends of the roll, or by using different ratios of roll during roll in opposite directions, or by combining both change of cutter position and the variation in ratio of roll.

Moreover, when the machine is provided with means for varying the ratio of roll, it is possible to cut tooth profile shapes of other than true involute form. It is possible, therefore, to rough gears that are intended to transmit non-uniform motion as well as gears for transmitting uniform motion. The process of taper-cutting by using different ratios of roll during roll in opposite directions may be employed alone when pinions having teeth of high-spiral angle are to be cut, but for cutting pinions of low or zero spiral angle it is preferable to combine change of position of the cutter with change in ratio of roll to secure taper.

In the preferred embodiment of the invention, the cutter is journaled eccentrically in an oscillatable carrier that in turn is journaled eccentrically in the generating cradle, and the work spindle is mounted on a slide that is moved in and out in the direction of the axis of the cradle to produce the feed and withdrawal movements. The cradle is driven in time with the rotation of the work spindle to effect the generating operation. At the ends of the roll, change of position of the cutter is effected by combined angular movement of the cradle and of the eccentric carrier. The cradle is driven by a worm and worm-wheel, and set-over of the cradle is effected by axial movement of the cradle worm through a hydraulically reciprocable piston. Set-over of the eccentric carrier is also effected hydraulically through a reciprocable piston which has a geared connection with the carrier. The movements of the two pistons are controlled by separate cam-governed valves. The cams for governing these valves are preferably made integral with the cam that controls the feed and withdrawal movements of the work slide and are so constructed that both cradle and carrier are set over at the end of the forward roll of the cradle and are returned to initial positions at the end of the return roll. During actual cutting, the eccentric carrier remains in fixed position and, unless the mechanism for varying the ratio of roll is used to produce modified tooth profiles, the cradle worm also remains in axially fixed position. The valve-control cams are preferably so constructed and the hydraulic mechanisms are preferably so interlocked that at the end of the forward roll, set-over of the cradle occurs before set-over of the carrier and that at the end of the return roll set-back of the cradle occurs before set-back of the carrier. A safety mechanism is provided to insure that the changes in positions of cradle and carrier at the opposite ends of the roll are completed before the roll in the opposite direction begins.

For producing variation in the ratio of roll, the cradle worm is moved axially during actual cutting. This varies the ratio of cradle movement to work rotation. Where it is desired to cut gears for transmitting uniform motion but having tooth profile shapes slightly modified from involute form, the axial movement of the cradle worm may be produced through a pair of rollers that are mounted eccentrically on a plate which is driven in time with the rotary motion of the cradle worm. The two rollers are adjustable to different angular positions about the axis of the plate and when the cradle is moving in one direction, the cradle worm is held in operative relation with one roller while when the cradle is moving in the opposite direction the cradle worm is held in operative relation with the other roller. Thus the cradle worm is moved axially different amounts for opposite directions of movement of the cradle to vary the ratio of roll different amounts during roll in opposite directions.

Where it is desired to cut gears for transmitting non-uniform motion, cams instead of rollers may be employed to produce the variation in ratio of roll. In this way, wider variations in ratio of roll can be obtained. Separate cams may be provided for controlling the axial movement of the cradle worm during roll of the cradle in opposite directions.

Set-over from one roller to the other or from one cam to the other in the ratio of roll control mechanism at opposite ends of the roll is effected hydraulically through movement of the piston which is connected to the cradle worm.

The amount of set-over of both cradle and eccentric carrier is adjustable through adjustment of the stroke of the piston that effects that set-over. When it is desired to obtain the taper-cut through difference in the ratio of roll alone on roll in opposite directions, then the carrier set-over piston can be set for zero stroke and no set-over of the carrier will occur. Only the position of the cradle worm will then be changed at opposite ends of the roll, and that change will be for the purpose of moving the worm out of operative relation with one ratio of roll control-roller or cam into operative relation with the other. When it is desired to obtain the taper-cut solely by change of position of the cutter, then the drive to the ratio of roll control-rollers or cams is disconnected, so that no movement of the cradle worm occurs during cutting.

While the machine is intended primarily for the cutting of pinions, it may also be used for the cutting of gears, and the term "gear" as used hereinafter in the specification and claims is intended to comprise either member of a gear-pair. Further, while the machine is described especially as used for rough-cutting, it will be understood that it may be employed for finish-cutting also, and that the same motions may be employed for finish-cutting gears with tooth spaces tapering longitudinally in width as are employed for roughing the tapering-width tooth slots.

In the drawings:

Fig. 4 is a fragmentary sectional view, showing details of the drive to the cradle and of the mechanism that may be employed for shifting the cradle worm axially at the ends of the cradle roll where the taper-cut is to be effected solely by change of position of the cutter between rolls in opposite directions.

Fig. 5 is a plan view and Fig. 6 a section on the line 6—6 of Fig. 5, showing the mechanism for shifting the eccentric carrier or cutter at opposite ends of the cradle roll;

Figure 14:
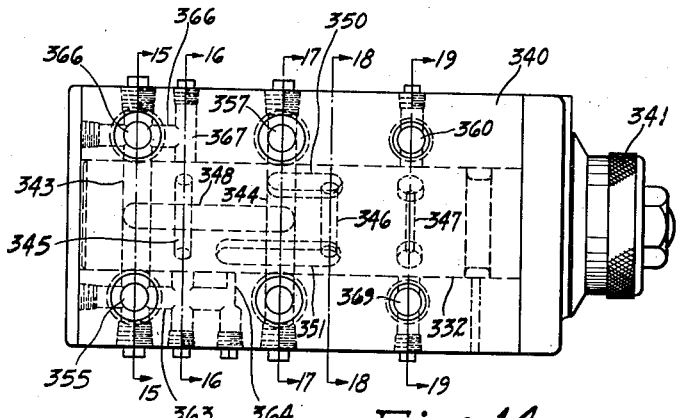
Fig. 14 is an elevational view of the hand valve for controlling the direction of set-over movement of the eccentric carrier relative to the direction of set-over movement of the cradle worm.
Figure 20:
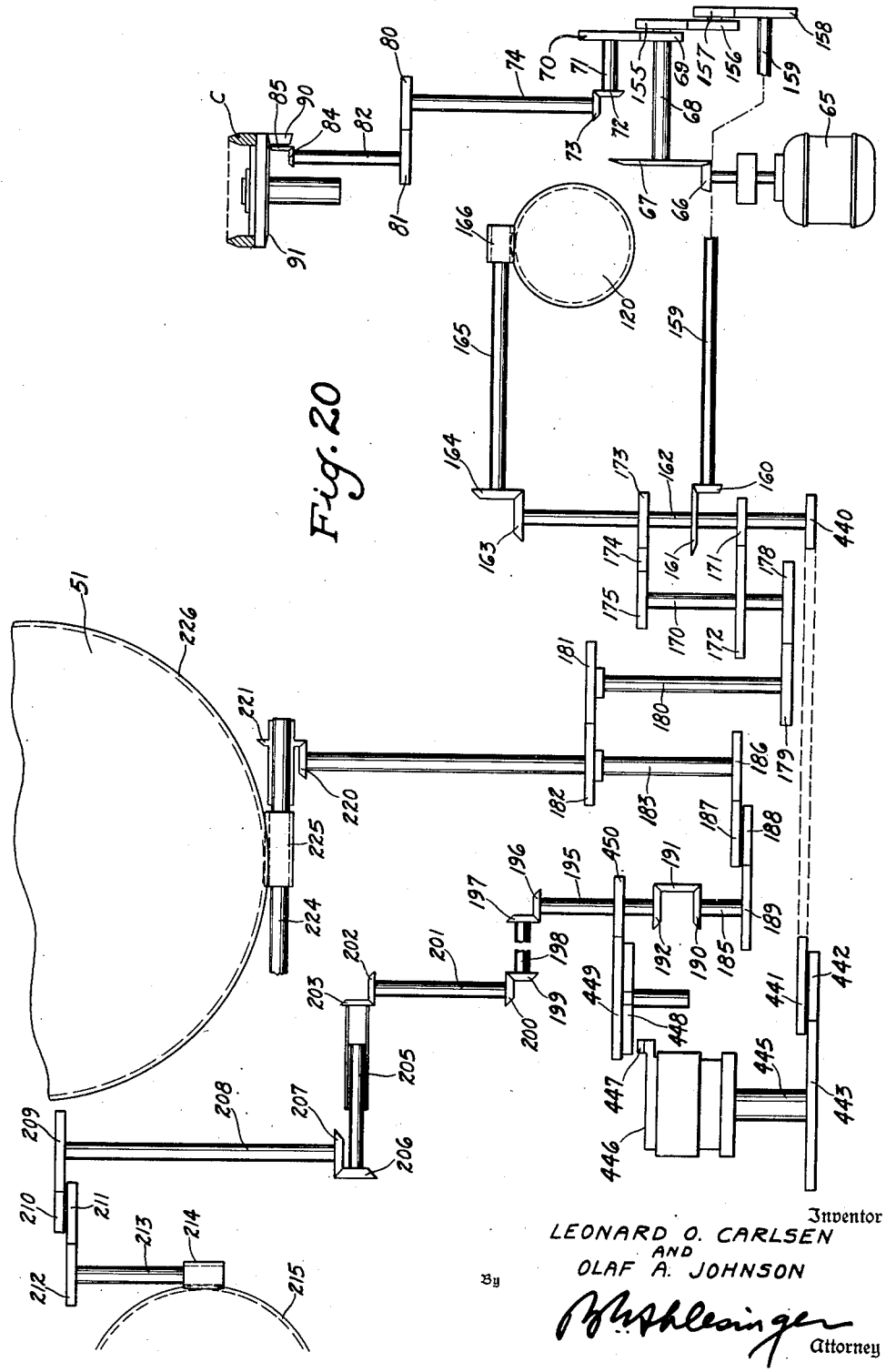
Figure 21:
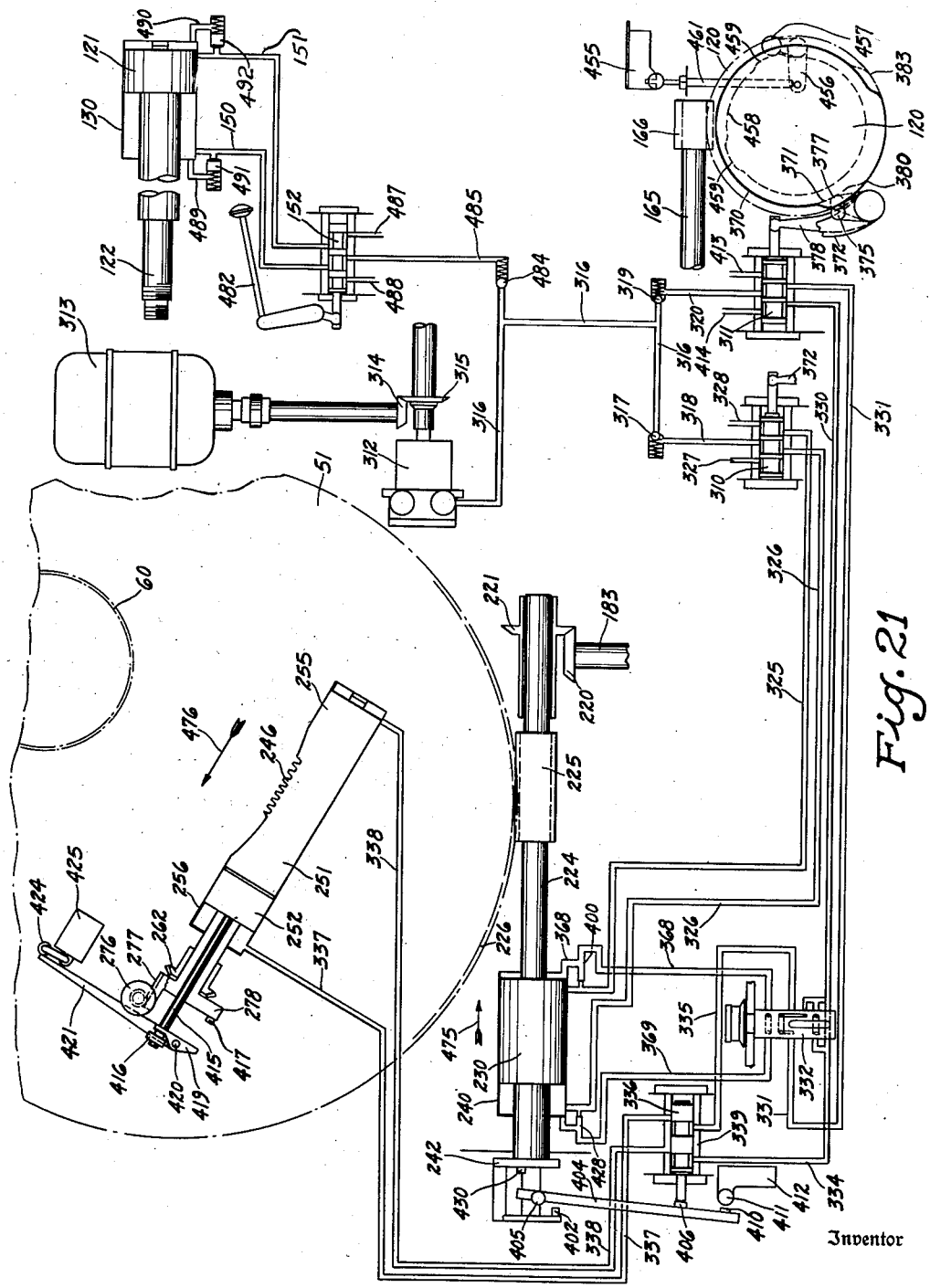
Figure 26:
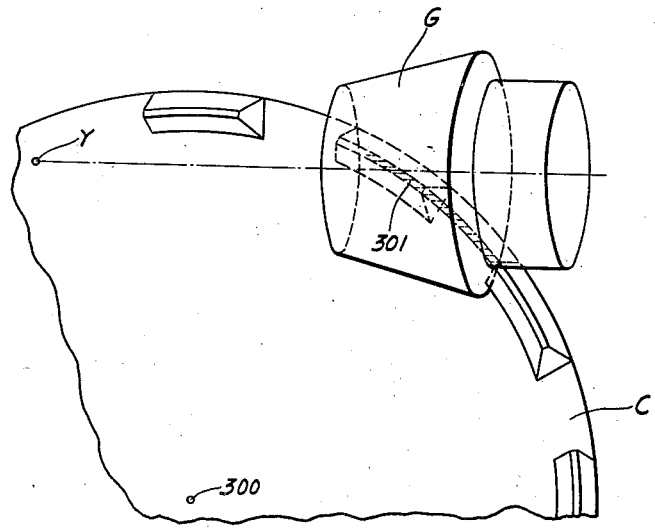
Figure 27:
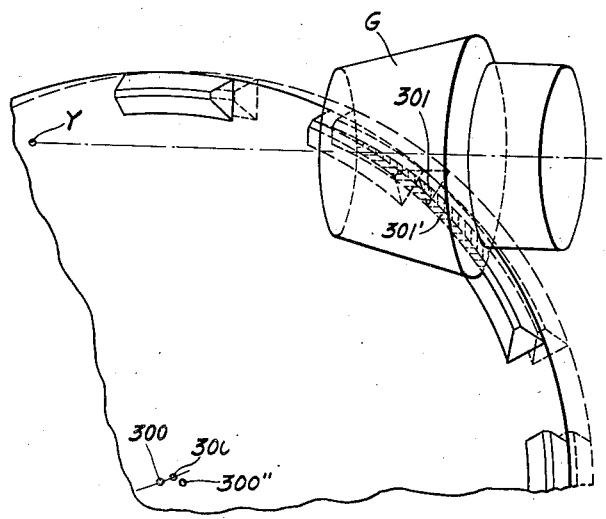
Figure 34:
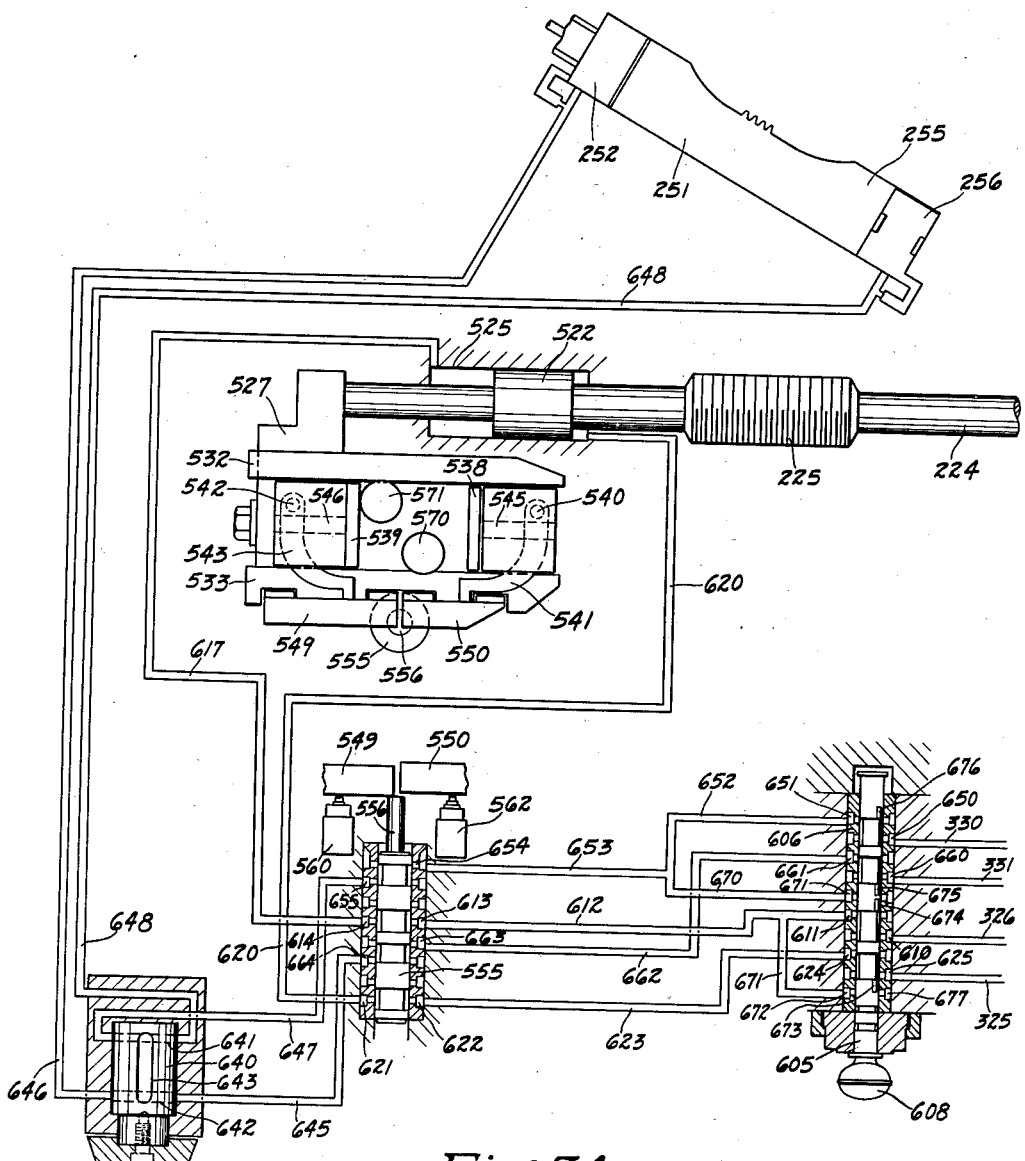
Figure 35:
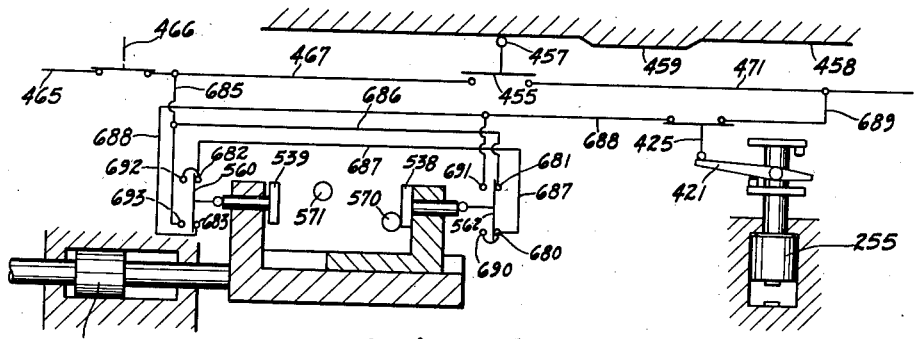
Figure 36:
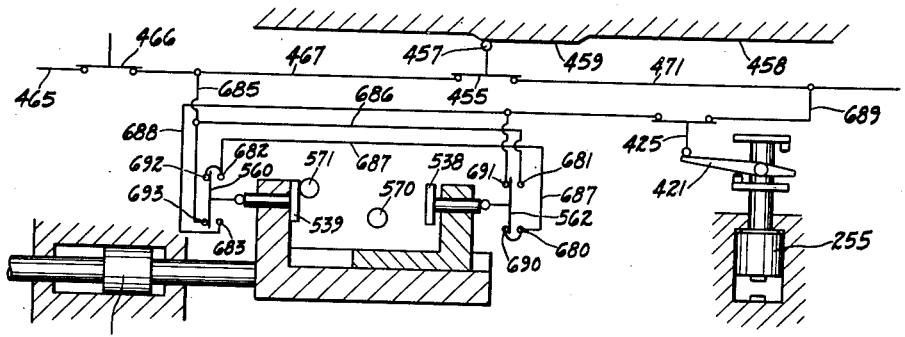
Figure 37:
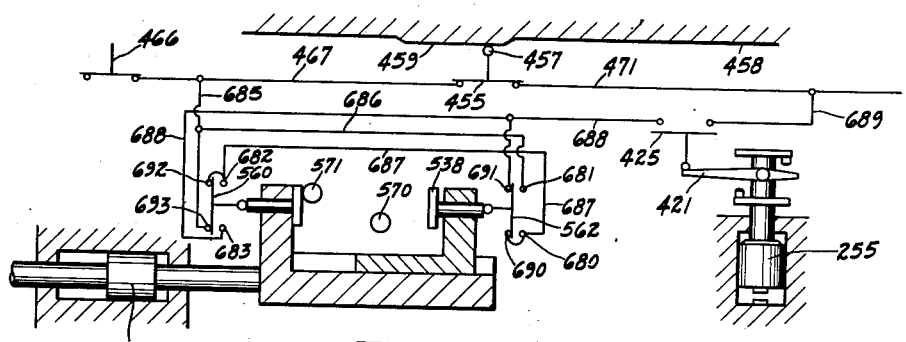
Figure 38:
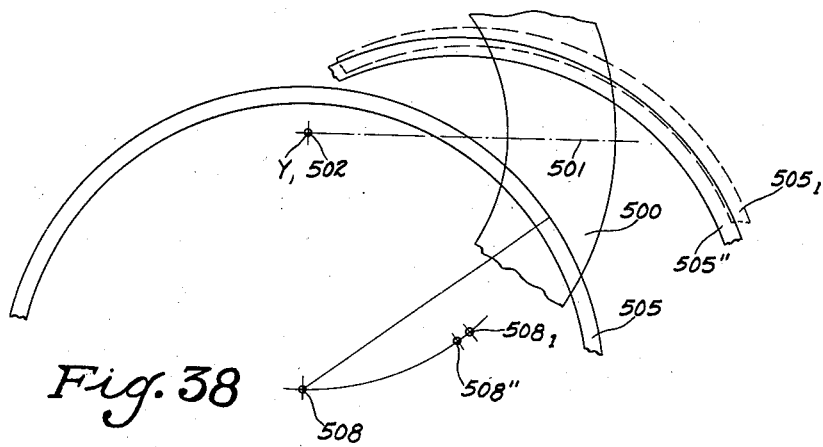
Figure 39:
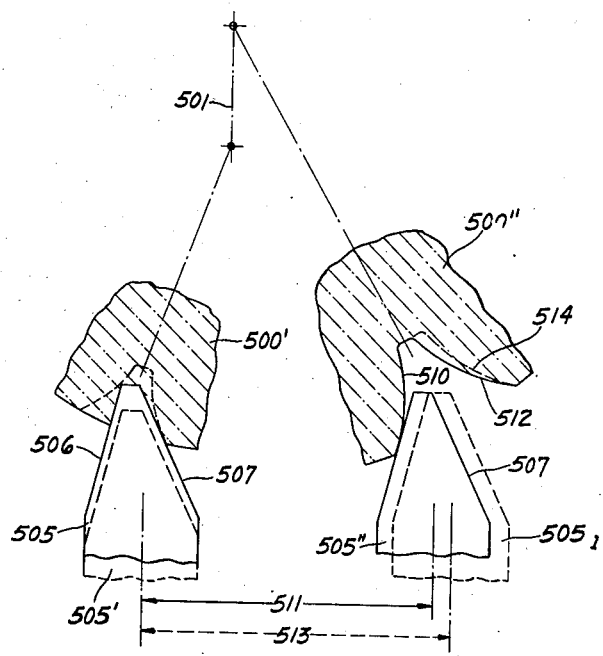
Figure 40:
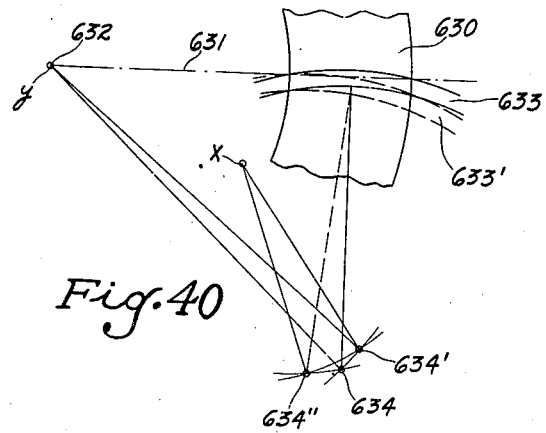
Figure 41:
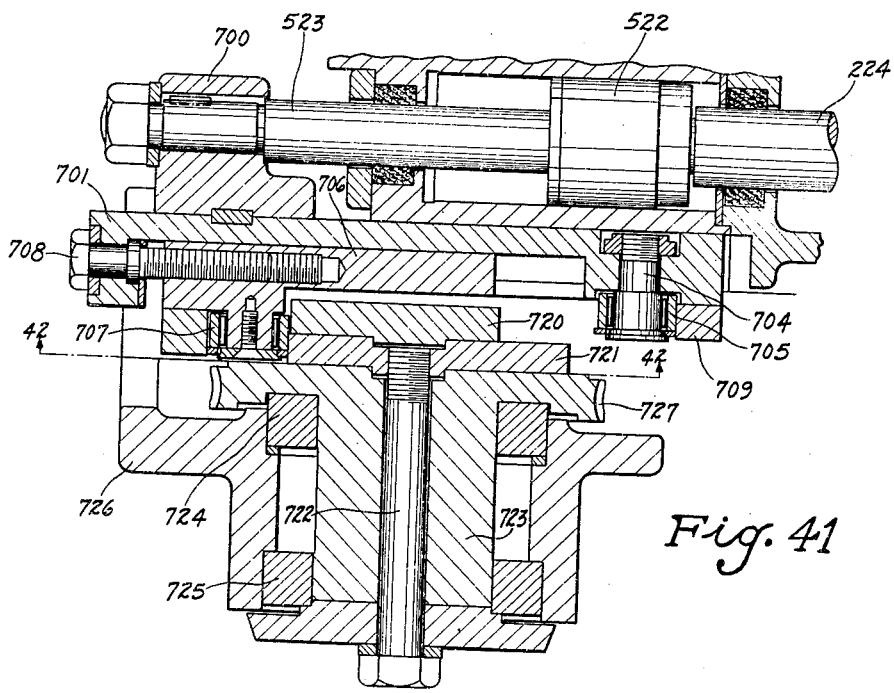

Figs. 15 to 19 inclusive are sectional views on the lines 15—15, 16—16, 17—17, 18—18, and 19—19, respectively, of Fig. 14;

Fig. 20 is a diagrammatic view, showing the drive gearing of the machine;

Fig. 21 is a diagrammatic view, illustrating the connections between and operation of the hydraulically actuated parts of the machine;

Figs. 22 to 25 inclusive are diagrammatic views, illustrating the operation of the safety devices of the machine;

Figs. 26 and 27 are fragmentary views, illustrating diagrammatically the work done by the cutter during the forward roll and the work done by the cutter during the return roll, where the taper-cut is obtained simply by change of positions of the eccentric carrier and cradle between the forward and return rolls;

Fig. 28 is a fragmentary sectional view similar to Fig. 4, illustrating one form of drive for the cradle which may be used where it is desired to modify the ratio of roll during roll in both directions;

Fig. 29 is a sectional view taken at right angles to the view of Fig. 28 and further illustrating the mechanism for modifying the ratio of roll and its connection to the cradle worm;

Fig. 30 is a fragmentary sectional view of the valve which controls the interlock between the cradle and eccentric in this form of machine and of the mounting for this valve;

Fig. 31 is a fragmentary end elevational view of the mechanism for modifying the ratio of roll;

Fig. 32 is a section on the line 32—32 of Fig. 31;

Fig. 33 is a fragmentary view on an enlarged scale, illustrating the operation of the mechanism for tripping the safety limit switches;

Fig. 34 is a fragmentary diagrammatic view, illustrating the hydraulic connections employed where the machine uses the previously illustrated modified roll mechanism;

Figs. 35 to 37 inclusive are diagrammatic views, illustrating the operation of the safety devices in the machine employing the modified roll mechanism;

Figs. 38 and 39 are diagrammatic elevational and sectional views, respectively, illustrating the operation of the machine where the taper-cut is obtained simply by using a different ratio of roll during the forward generating movement from that employed on the return generating movement;

Fig. 40 is a diagrammatic view illustrating how the taper-cut is obtained where both a shift of the cutter and a change in ratio of roll is provided;

Fig. 41 is a fragmentary sectional view on an enlarged scale illustrating a modified form of mechanism which may be used for varying the ratio of roll where, for instance, it is desired to cut gears that will transmit non-uniform motion; and Fig. 42 is a section on the line 42—42 of Fig. 41, looking in the direction of the arrows.

In many respects, the machine of the present application is similar in construction and operation to the gear generating machine of the pending application of Leonard O. Carlsen, Serial No. 305,876, filed November 24, 1939, now Patent 2,302,004, issued November 17, 1942. For this reason, we have not illustrated in detail those parts which are common to the two machines except where it is necessary to an understanding of the present invention.

50 denotes the base or frame of the machine. The cradle 51 is mounted in semi-circular bearings formed in the base and is held in position by a semi-circular cap 52 which is secured to the base by screws 53. The cradle is a full circular cradle and revolves on roller bearings 54 and 55 that are mounted in spaced full circular raceways formed in the base and cap. Mounted in the cradle 51 for oscillation about an axis X (Fig. 2) eccentric of the axis Y of the cradle is a carrier 56. This carrier is journaled in the cradle on the spaced plain bearings 57 and 58 (Fig. 3).

Figure 2:
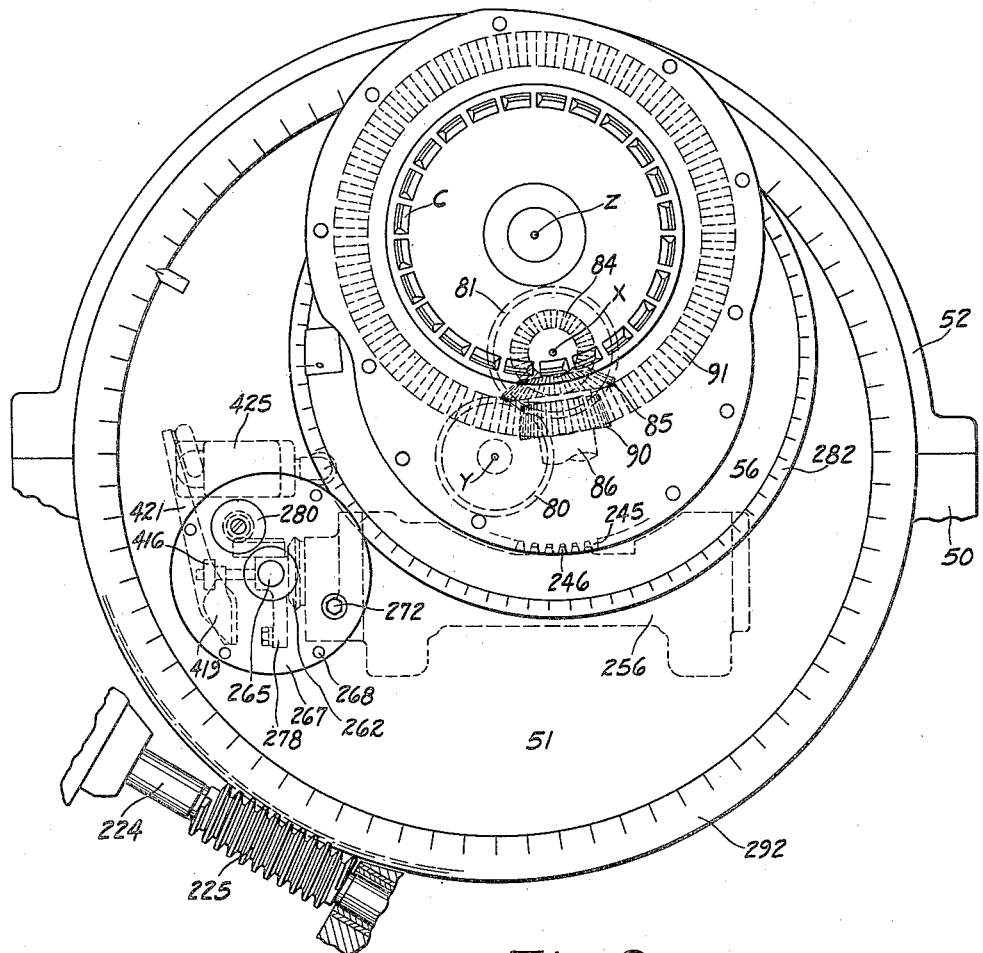
Fig. 2 is a fragmentary elevational view, looking at the front end of the cradle of this machine.
Figure 3:
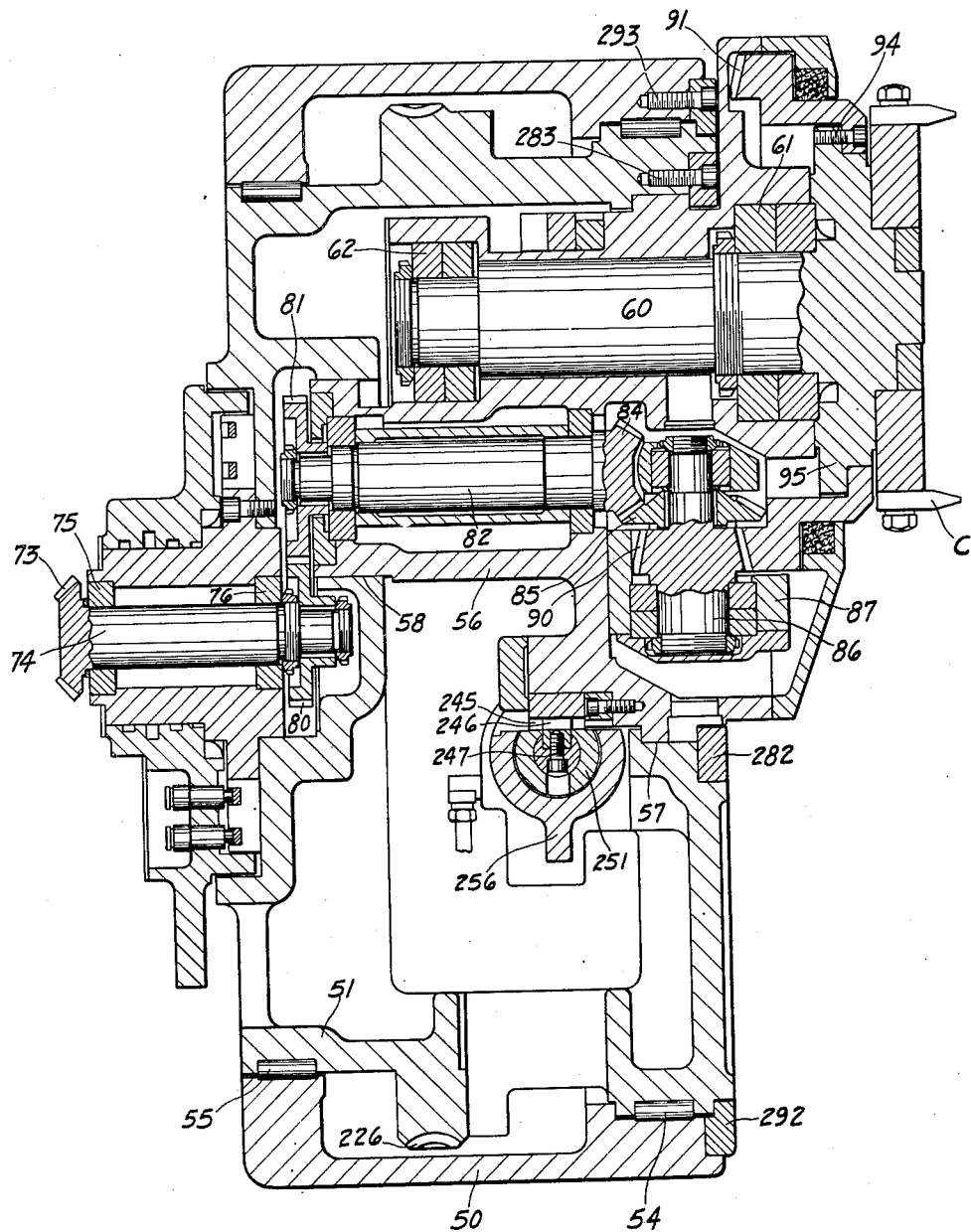
Fig. 3 is a transverse sectional view through the cradle, showing in particular, details of the cutter mounting and of the cutter drive.

Journaled in the carrier 56 for rotation about an axis Z, (Fig. 2) which is eccentric of the axis X of the carrier, is the cutter spindle 60 (Fig. 3). This spindle is mounted in the carrier on spaced anti-friction bearings 61 and 62. The face-mill gear cutter C, which is to be used for cutting gears on the machine, is secured to the cutter spindle 60 in the usual or any suitable manner.

During the operation of the machine, the cutter is rotated continuously on its axis. The drive to the cutter is similar to that employed in the machine of the Carlsen application above mentioned. It is derived from a motor 65 (Figs. 1 and 20) that is suitably mounted on the base of the machine. There is a bevel pinion 66 coupled to the armature shaft of the motor. This bevel pinion meshes with a bevel gear 67 that is secured to a vertical shaft 68. Secured to the upper end of the shaft 68 is a spur gear 69. The gear 69 meshes with a spur gear 70 that is fastened to a parallel shaft 71. Secured to the lower end of the shaft 71 is a bevel gear 72. This bevel gear meshes with a gevel gear 73 (Figs. 3 and 20) that is keyed to a horizontal shaft 74.

The shaft 74 is journaled on spaced anti-friction bearings 75 and 76 coaxially of the axis Y of the cradle. At its inner end, the shaft 74 carries a spur gear 80 (Figs. 2, 3, and 20). This spur gear 80 meshes with the spur gear 81 that is keyed to a shaft 82. The shaft 82 is journaled on spaced anti-friction bearings in the carrier 56 coaxially of the axis X of the carrier. Integral with the shaft 82 is a bevel pinion 84. This pinion meshes with a bevel gear 85. This gear is keyed to a stub-shaft 86 that extends at right angles to the shaft 82 and that is journaled on anti-friction bearings in the sleeve 87 which is secured in any suitable manner to the carrier 56. There is a bevel pinion 90 integral with the shaft 86, and this bevel pinion meshes with a bevel gear 91 which is secured by screws 94 to the enlarged head or flange 95 of the cutter spindle 60.

Figure 1:
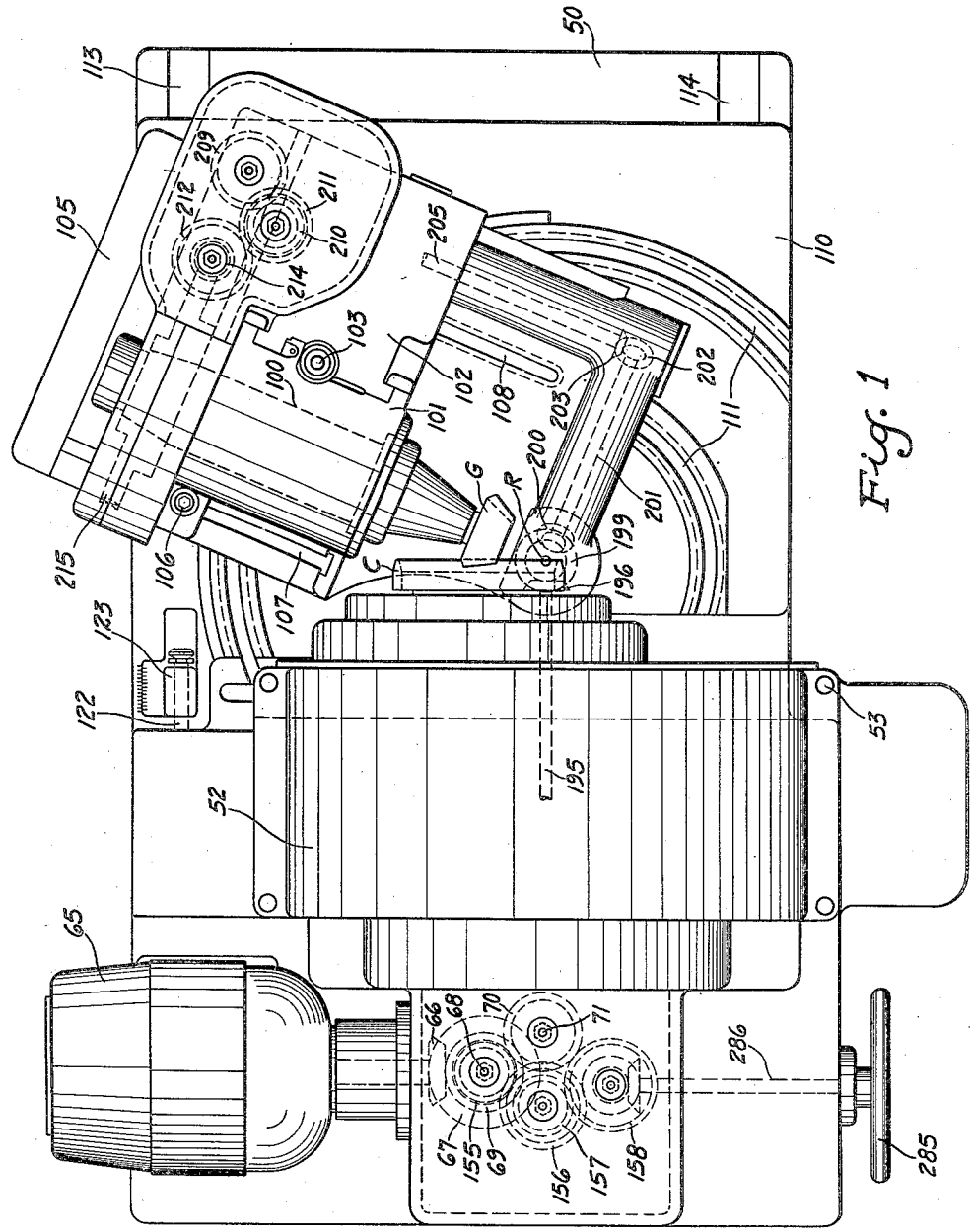
Fig. 1 is a plan view of a combined bevel and hypoid gear generator built according to one embodiment of this invention.

The gear or pinion blank G, which is to be cut, is secured to the work spindle 100 of the machine (Fig. 1). The work spindle is journaled in the work head 101. This head is mounted for vertical adjustment on a column 102 to permit offsetting the axis of the work spindle with reference to the axis of the cradle if desired in the cutting of hypoid pinions. This adjustment is effected by rotation of a screw shaft 103 in the same manner as in the machine of the Carlsen application above mentioned. The column 102 is mounted on a plate 105 for rectilinear adjustment thereon in the direction of the axis of the work spindle. Adjustment is effected manually and, after adjustment, the column is secured to the plate 105 by T-bolts 106 which engage in elongated slots 107 and 108 formed in the upper face of the plate 105. This adjustment serves to position the work in accordance with the cone distance of the gear to be cut.

The plate 105 is adjustable angularly on the sliding base 110 of the machine to set the work to its root-cone angle. This adjustment is effected in known manner about an axis R which extends at right angles to the axis Y of the cradle and intersects the same. After adjustment, the plate 105 may be secured to the sliding base 110 by T-bolts (not shown) which engage in arcuate T-slots 111 that are formed in the upper face of the sliding base 110 concentric of the axis R.

The sliding base 110 is reciprocable in the direction of the axis Y of the cradle. It slides on ways 113 and 114 formed on the upper face of the base 50 of the machine. It is fed inwardly to move the work into operative relation with the cutter and to cut a tooth space of the desired depth, and it is moved outwardly to withdraw the work from engagement with the cutter, for indexing the gear blank.

The alternate movements of feed and withdrawal of the sliding base are in a limited path. To permit removal of a completed gear blank and chucking of a new blank, the sliding base 110 is movable a more extended distance outwardly on the base of the machine. The alternate feed and withdrawal movements are produced by rotation of the feed cam 120 (Fig. 11) and the more extended movement for chucking is effectuated by movement of the piston 121. The construction and operation of feed-cam and piston is similar to that described in the Carlsen application already mentioned.

The piston 121 is formed integral with a rod 122 which has threaded engagement with a block 123. This block 123 is fastened to the sliding base 110 of the machine by T-bolts 124 whose heads engage in an elongated T-slot 125 formed in the upper face of the sliding base. The piston 121 is reciprocable in a cylinder 130. This cylinder is slidably mounted in aligned plain bearings 131 and 132 formed in a bracket 133 which is secured in any suitable manner in the base of the machine.

The cylinder 130 is adjustably and pivotally secured to a lever 135 in the manner described more particularly in Carlsen application No. 305,876. The lever carries a pair of posts 136 and 137 on which are mounted rollers 138 and 139, respectively. The rollers 138 and 139 are adapted to be engaged with the tracks 140 and 141, respectively, of the cam 120. The posts 136 and 137 are mounted in the lever 135 for axial reciprocatory adjustment. Racks 142 and 143, respectively, are cut in the opposed adjacent faces of the posts, and a spur pinion 144 is mounted in the lever 135 in position to engage the two racks simultaneously. By rotation of this pinion 144, then, the posts 136 and 137 can be moved simultaneously in opposite directions to engage one of the rollers with one of the tracks of the cam 120 and simultaneously move the other out of engagement with the other track. The two tracks 140 and 141 are provided in the cam 120 so that the machine may be employed at will either for rough-cutting or for finish-cutting. One track is shaped to produce a cycle of movement of the sliding base which will be suitable for rough-cutting, and the other track is shaped to produce a cycle of movement suitable for finish-cutting.

Figure 11:
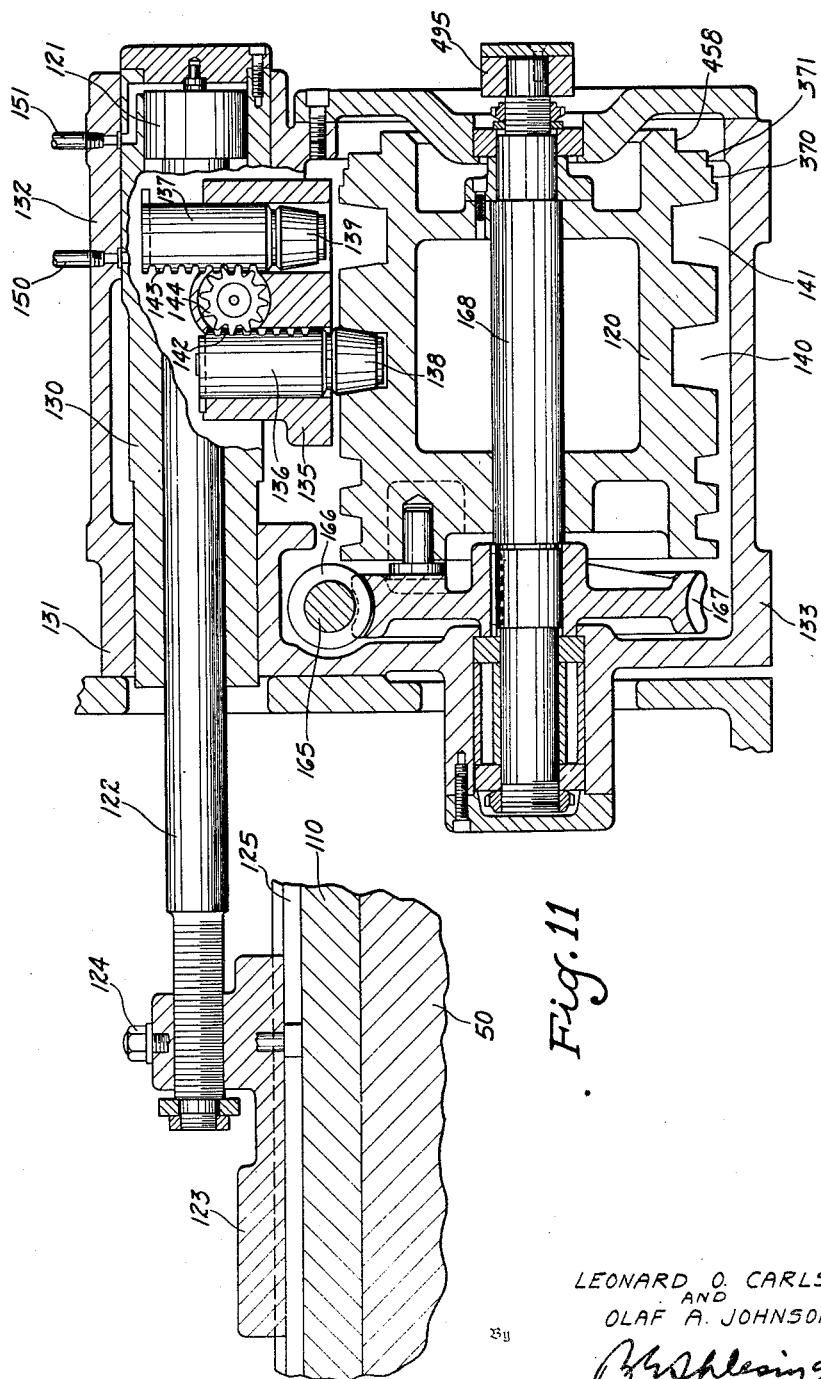
Fig. 11 is a fragmentary sectional view on an enlarged scale of the feed cam of the machine and of the mechanism which connects this cam with the sliding base.

Fluid under pressure may be admitted selectively to opposite sides of the piston 121 through ducts 150 and 151. A hand operated valve 152 (Fig. 21) serves to control the direction of application of the pressure fluid to the piston. The piston is shown in Fig. 11 in the position which it occupies during the cutting of the teeth of a gear blank. It is bottomed in the right hand end of the cylinder 130 and is held in such position during cutting by the pressure fluid admitted through the duct 150. As the cam 120 rotates, then, the position of the cylinder 130 and of the sliding base 110 will be determined by the contour of the track 140 or 141 of the cam 120 which, at the time, is operative. Thus the work may be fed into cutting position, held there during cutting, and then withdrawn for indexing.

The drive to the cam 120 is similar to that employed in the machine of Carlsen application No. 305,876 already mentioned. Mounted on the shaft 68 is a spur gear 155 (Figs. 1 and 20). This spur gear 155 constitutes one member of a set of change gears of which the other members are denoted at 156, 157, and 158, respectively. The spur gear 158 is mounted on a shaft 159, and to the lower end of this shaft there is keyed a bevel pinion 160. The bevel pinion 160 meshes with a bevel gear 161 which is secured to a shaft 162. Fastened to this shaft 162 is a bevel gear 163 which meshes with a bevel gear 164. The bevel gear 164 is secured to a shaft 165 which has a worm 166 integral with it. The worm 166 meshes with a worm-wheel 167 (Figs. 11 and 20). The wormwheel 167 is keyed to a shaft 168 that is suitably journaled in the bracket 133. The cam 120 is keyed or otherwise secured to the shaft 168.

After the work has been moved into the desired depthwise operative engagement with the cutter, the generating roll begins. During the generating roll, the cutter rotates in engagement with the blank, and the blank rotates on its axis in timed relation with the movement of the cradle 51 on its axis.

The drive for imparting to the work its generating rotation is similar to that employed in the machine of the Carlsen application above mentioned. The shaft 162 (Fig. 20) drives the shaft 170 either through the spur gears 171 and 172 or through the spur gears 173, 174, and 175. When the drive is through the spur gears 171 and 172, the shaft 170 is driven in one direction. When the drive is through the spur gears 173, 174, and 175, the shaft 170 is driven in the opposite direction. The direction of drive is determined by the reversing mechanism of the machine which may be of standard construction and such, for instance, as disclosed in Carlsen Patent 2,000,215 of May 7, 1935.

The shaft 170 carries a spur gear 178 which meshes with a spur gear 179 that is secured to shaft 180. The shaft 180 carries a spur gear 181 which meshes with a spur gear 182 that is secured to a shaft 183. The shaft 183 drives a shaft 185 through a set of ratio change gears 186, 187, 188, and 189. The shaft 185 carries a bevel gear 190 which forms one member of a differential of which the other two members are designated at 191 and 192, respectively. The member 192 is secured to a shaft 195 which carries the bevel gear 196. The bevel gear 196 meshes with a bevel gear 197 (Figs. 1 and 20) which is secured to the lower end of a shaft 198. The shaft 198 is journaled in the base of the machine coaxial with the axis R of angular adjustment of the plate 105. At its upper end, the shaft 198 carries a bevel gear 199 which meshes with a bevel gear 200 that is secured to a diagonal shaft 201. The diagonal shaft 201 carries the bevel gear 202 which meshes with the bevel gear 203 that is secured to a horizontal telescoping shaft 205. The shaft 205 carries at its rear end a bevel gear 206 which meshes with a bevel gear 207 that is secured to the lower end of a vertical telescoping shaft 208. At its upper end, the shaft 208 carries a spur gear 209 which forms one of a set of index change gears of which the other members are denoted at 210, 211, and 212, respectively. The gear 212 is secured to a shaft 213 to which is secured the worm 214. This worm meshes with the wormwheel 215 which is secured to the work spindle 100 of the machine. Thus the work spindle is rotated in either direction depending upon the direction of the rotation of the shaft 170 as determined by the operation of the reversing mechanism of the machine.

As already indicated, generation of the tooth profiles of the gear to be cut is effected by a swing of the cradle 51 in time with the rotation of the work spindle. The drive to the cradle is from the shaft 183. This shaft carries a bevel gear 220 (Fig. 20) which meshes with a bevel gear 221 (Figs. 4 and 20). The bevel gear 221 is integral with a sleeve 222 that is journaled in the base of the machine, and this sleeve has a telescoping splined connection with the shaft 224. There is a worm 225 integral with the shaft 224, and this worm meshes with the wormwheel 226 (Figs. 3, 4 and 20) that is integral with the cradle 51.

Now, as already described, the machine is provided with means for shifting the cradle 51 and eccentric carrier 56 on their respective axes at the ends of the roll of the cradle in either direction, so that the cutter may cut from a different center on the return roll from the center from which it cuts on the forward roll. In the embodiment of the invention illustrated in Figs. 1 to 27 inclusive, the only means provided for obtaining the taper-cut is the mechanism for changing the position of the cutter between the roll in opposite directions.

For the purpose of shifting the cradle 51 at the ends of the roll in this form of machine, the worm shaft 224 is operatively connected to a piston 230 (Figs. 4 and 21). The worm shaft 224 is secured to a headed member 231 by the nuts 232, thrust bearings 233 and plate 234. The plate 234 is secured by screws (not shown) to the headed member 231. Journaled in the headed member 231 is a shaft 235 which is threaded for part of its length and which screws into the stem portion 236 of the piston 230.

The piston 230 reciprocates in a cylinder 240 which is secured to the base of the machine. The screw shaft 235 may be rotated manually to adjust the length of stroke of the piston, that is, the amount of set-over of the cradle at the ends of the roll. Rotation of the screw-shaft adjusts the piston 230 axially with reference to the headed member 231. For the purposes of making this adjustment precisely, there is a graduated dial 241 secured to the outer end of the screw shaft 235, and there is a graduated arm 242 secured by screws 243 to the stem portion 236 of the piston. The graduations of the arm 242 read against an index pointer 244 that is fixedly secured to the screw shaft 235.

Fluid under pressure is supplied to one side of the piston 230 to shift the cradle in one direction at one end of the roll and is supplied to the opposite end of the piston to shift the cradle in the opposite direction, to return it to initial position, at the other end of the roll.

The shift of the eccentric carrier at opposite ends of the roll is also effected through fluid pressure operated mechanism. There is a spur gear segment 245 (Figs. 2 and 3) secured in any suitable manner to the eccentric carrier 56. A rack 246 (Figs. 2, 3, 5, 6, and 21) meshes with this segment 245. The rack 246 is secured by screws 247 to a member 248. This member is mounted within the bore 250 of a sleeve 251 which forms one part of a split piston of which the other part is denoted at 252.

The piston, which is denoted as a whole at 255 in Fig. 21, is adapted to reciprocate in a cylinder 256 that is mounted on the cradle of the machine. The two parts 251 and 252 of the piston are adjustable relative to one another to determine the length of stroke of the piston, that is, the amount of set-over of the eccentric carrier 56. For the purposes of effecting this adjustment, a hollow shaft 260 is provided. This shaft is journaled in the part 252 of the split piston 255 and is held against axial movement relative thereto by a shoulder formed on the shaft and by a nut 258 which threads on the shaft and which seats against a packing member 259 that is mounted in the part 252 of the piston. The shaft 260 is keyed to the sleeve portion 261 of a bevel gear 262 which is journaled in the cap member 263. The cap member 263 is secured by screws or other suitable means to one end of the cylinder 256. The shaft 260 is of reduced diameter at its inner end and is threaded to thread into the member 248.

For adjusting the two parts 251 and 252 of the piston 255 relative to one another, there is a manually rotatable shaft 265 journaled in a bracket 266 (Figs. 2, 7 and 8) which is secured to the cradle 51. The outer end of the shaft projects through a disc 267 which is secured by screws 268 to the outer face of the cradle. There is a bevel gear 269 keyed to the inner end of the shaft 265 and this bevel gear meshes with the bevel gear 262. By rotating the shaft 265 manually with a suitable tool, the two parts 251 and 252 of the split piston 255 can be adjusted with reference to one another to determine the length of stroke of the piston. There is a graduated dial 264 keyed to the shaft 265 to permit the adjustment to be made accurately.

The shaft 260 is normally locked against rotation by the clamping blocks 270 and 271 (Figs. 8 and 9) which are arranged to engage the periphery of the sleeve 261 of the bevel gear 262. The two blocks 270 and 271 are pulled toward one another to clamp the sleeve 261 by a manually operable shaft 272 which is journaled in the disc 267 and the block 270 and which threads into the block 271.

For adjusting the cutter initially to obtain the settings required to cut teeth of the desired spiral angle on the blank, the eccentric carrier and the cradle are adjusted manually about their respective axes. To adjust the eccentric carrier a manually rotatable shaft 275 (Fig. 8) is provided. There is a spur pinion 276 integral with this shaft at its inner end. This pinion meshes with a rack 277 (Figs. 5 and 6) that is integral with an arm 278 which is mounted on the reduced outer end portion of the shaft 260. The arm 278 is bored to receive the outer end of the shaft 260 so that the shaft may rotate within the arm 278, but the arm is held against axial movement relative to the shaft by a shoulder formed on the shaft and by the nut 279.

When the shaft 275 is rotated, motion is transmitted to the pinion 276 and rack 277 to move the shaft 260 axially in the bevel gear 262, and to move the parts 252 and 251 of the piston 255 axially together in the cylinder 256. This motion is transmitted through the rack 246 and spur gear segment 245 to the carrier 56 to rotate the carrier on its axis, thereby adjusting the position of the carrier. A graduated dial 280 (Figs. 7 and 8) is secured by a screw 281 to the front end of the shaft 275 to permit precise adjustment of the carrier. The gib 282 (Figs. 2 and 3), which serves to retain the carrier 56 in the cradle, is suitably graduated for precise adjustment of the carrier. The gib 282 is secured to the cradle by screws 283, as shown in Fig. 3.

The angular adjustment of the cradle required for the spiral angle setting of the cutter may be effected by removing the roll change gear 170 (Fig. 20) and rotating the shaft 180 by hand by a crank-wrench or other suitable tool. The gib 292 (Figs. 2 and 3), which serves to hold the cradle 51 against axial movement in the base of the machine, is graduated as shown in Fig. 2, to permit the adjustment of the cradle to be made precisely. Screws 293 (Fig. 3) serve to hold the gib 292 in position.

Figure 12:
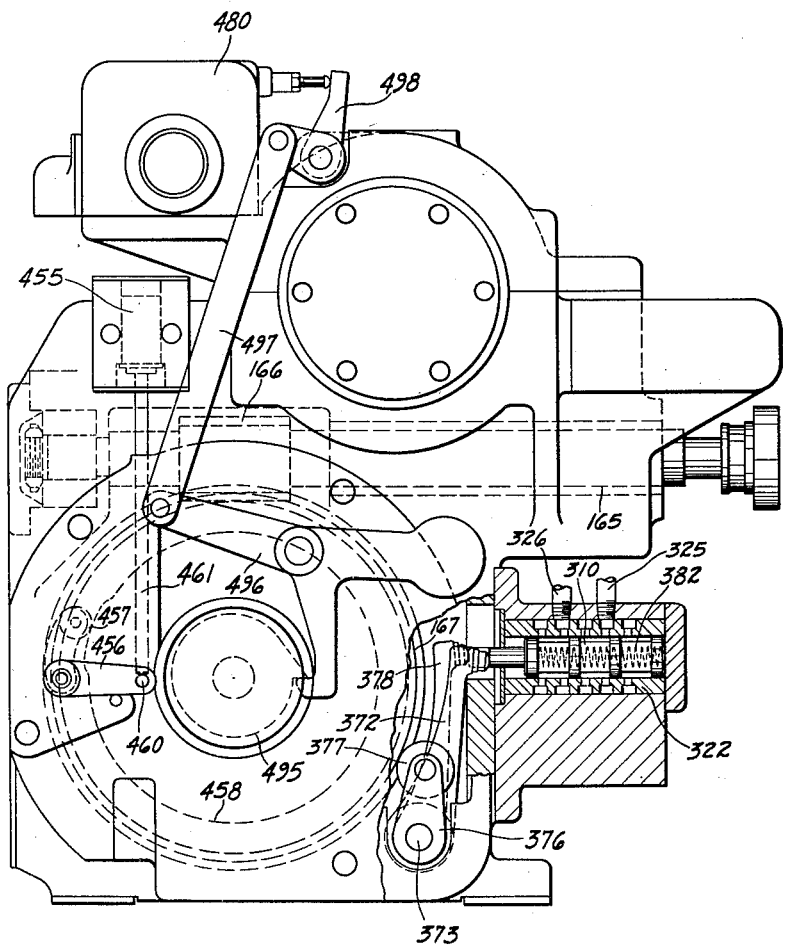
Fig. 12 is an end elevation, with parts broken away, of the mechanism shown in Fig. 11.
Figure 13:
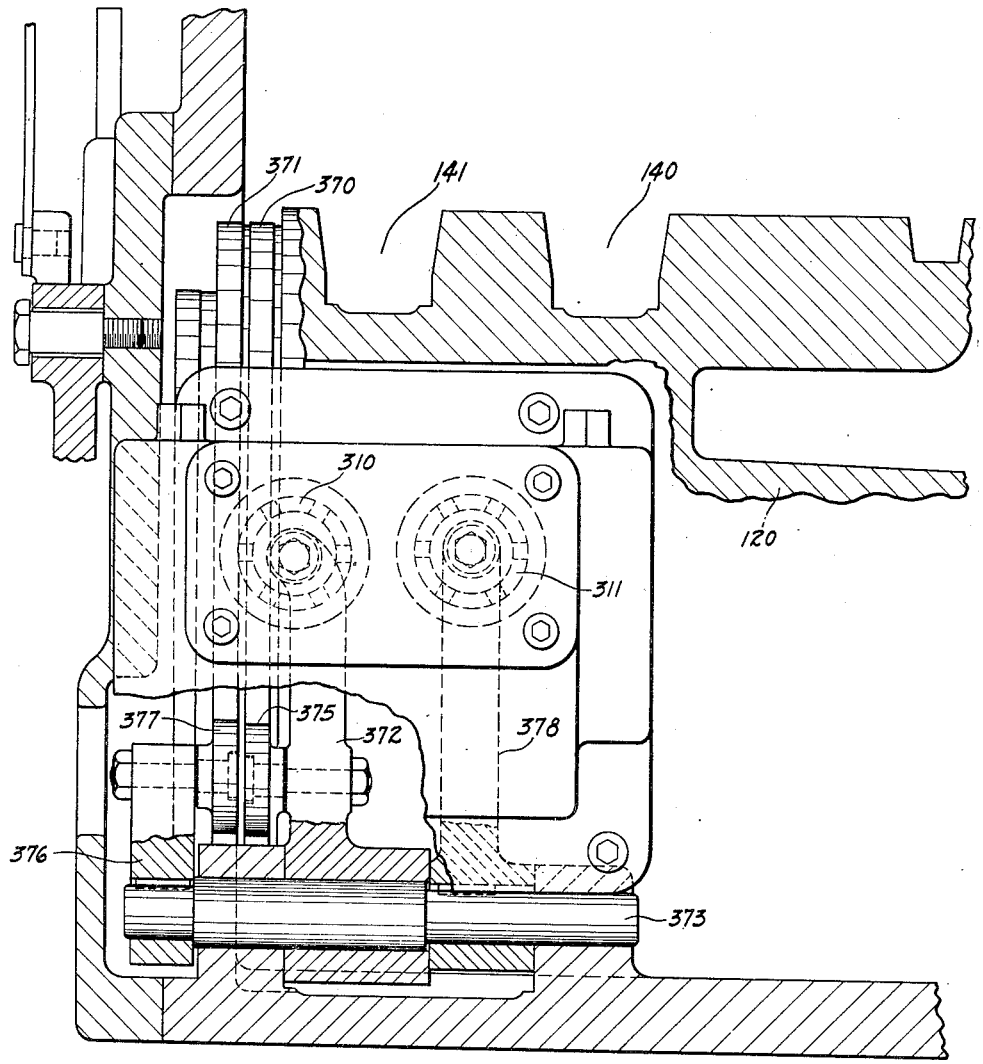
Fig. 13 is a part sectional, part elevational view on an enlarged scale of the feed cam and associated parts, looking at the opposite side from the view of Fig. 11.

The flow of the pressure fluid to the pistons 230 and 255 is controlled primarily by the two valves 310 and 311 (Figs. 12 and 21). The pressure fluid is supplied to these valves 310 and 311 from a pump 312 which may be of any suitable construction and which is driven from the motor 313 through the bevel gearing 314 and 315. The pressure fluid flows from the pump 312 through the line 316. Thence it may flow through the check valve 317 into the line 318 that leads to the valve 310. From the line 316 it may also flow through the check valve 319 into the line 320 that leads to the valve 311.

The valve 310 reciprocates in a sleeve 322 and is connected to opposite ends of the cylinder 240, in which the piston 230 reciprocates, through the ducts 325 and 326, respectively. The ducts 327 and 328, respectively, connect the valve 310 with the sump of the machine for exhaust.

The valve 311 is connected by ducts 330 and 331 with a manually adjustable rotary valve 332 (Figs. 14 to 19 inclusive and Fig. 21) that serves to control the direction of set-over of the eccentric carrier 56 relative to the direction of set-over of the cradle 51 and that is also adjustable to permit of initial spiral angle setting of the carrier and cradle. The construction and operation of the valve 332 will be described more particularly later.

The valve 332 is connected by the ducts 334 and 335 with a valve 336 (Figs. 4 and 21). This valve is reciprocable in a sleeve 339. It serves to interlock the pistons 230 and 255 so that the eccentric carrier 56 will not be shifted at either end of the cradle roll until the cradle has completed its shifting movement, as will be described more fully later. The valve 336 is connected by the ducts 337 and 338, respectively, with opposite ends of the cylinder 256. In Fig. 21, the valve 336 is shown in the position which it occupies when shift of the piston 230 and of the cradle is taking place. On completion of the shifting movement and during roll in both directions, the valve 336 is at the right hand end of the sleeve 339 in which it is mounted.

The valve 332 is a rotatably adjustable valve of the construction shown in Figs. 14 to 19 inclusive. It is mounted in the valve casing 340 and may be rotated by means of a knurled knob 341. It is formed with two ducts 343 and 344, respectively (Figs. 15 and 17), which are spaced from but parallel to one another and which extend diametrically through the valve. It is also formed with three other ducts 345, 346, and 347, which extend diametrically through it. These three ducts 345, 346, and 347 are parallel to one another but inclined at an angle of about 45° to the ducts 343 and 344. The valve has two diametrically opposite grooves 348 and 349 formed longitudinally in its periphery and extending for part of the length of the valve. Two other diametrically opposite grooves 350 and 351 are also formed in the periphery of the valve. These latter grooves are spaced angularly about the valve at about 45° from the grooves 348 and 349. They extend longitudinally of the valve but do not align longitudinally exactly with the grooves 348 and 349. Only the right hand ends of the grooves 348 and 349 overlap longitudinally the left hand ends of the grooves 350 and 351.

Figure 15:
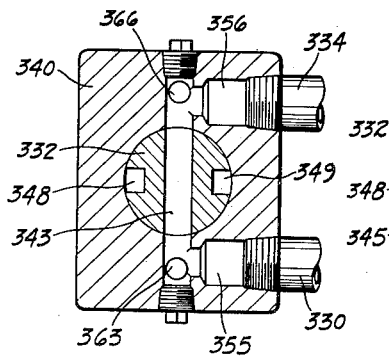
Figure 16:
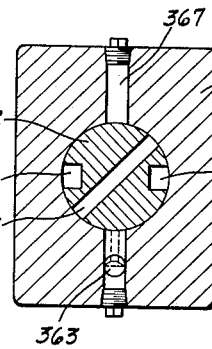
Figure 17:
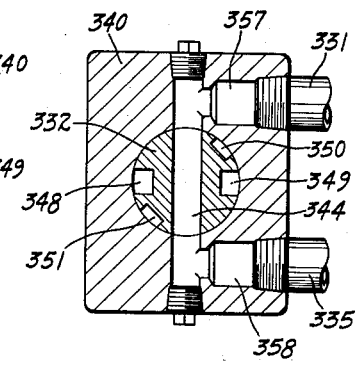
Figure 18:
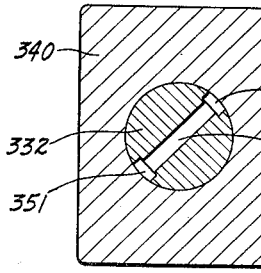

In the position shown in Figs. 14 to 19 inclusive and in Fig. 21, the duct 330 leading from the valve 311 is connected with the duct 334, which leads to the valve 336, through the duct 355 in the casing 340 of the valve 332, the duct 343 in the valve 332, and the duct 356 in the valve casing 340 (Fig. 15). In this position, the duct 331 leading from the valve 311 is connected with the duct 335 leading to the valve 336 through the duct 357 in the valve casing 340, the duct 344 in the valve 332, and the duct 358 in the valve casing 340 (Fig. 17).

When the valve 332 is turned a quarter turn, however, to bring the groove 348 into registry with the ducts 356 and 357 and to bring the groove 349 into registry with the ducts 355 and 358, then the duct 330 will be connected to the duct 335 through the duct 355, groove 349 and duct 358, while the duct 331 will be connected with the duct 334 through the duct 357, groove 348 and duct 356. Thus, by rotating the valve 332 through an angle of 90°, it is possible to change the direction of flow of the pressure fluid to the eccentric piston 255. The valve 332, therefore, permits of controlling the flow of the motive fluid in such way that the pistons 230 and 255 may be constrained to move either in the same direction or in opposite directions at the time of set-over.

Figure 19:
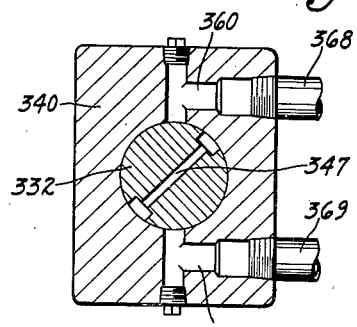

When adjusting the eccentric carrier and cradle for spiral angle setting of the cutter prior to starting the machine, the valve 332 is adjusted to an intermediate position at 45° from the position shown in Figs. 14 to 19. In this position, the groove 350 will register with the duct 357, the groove 351 with the duct 358, and the duct 347 (Fig. 19) with the ducts 360 and 361. In this position, also, the valve 332 will close and shut off direct communication between the ducts 355 and 356 and the line 330 will be connected directly with the line 331 through the duct 355, a duct 363 which is drilled in the valve casing 340 at right angles to the duct 355 (Fig. 14), a duct 364 also formed in the valve casing and communicating with the duct 363, the groove 351, duct 346, groove 350, and duct 357. Simultaneously, the line 334 will be connected with the line 335 through the ducts 356, 366, and 367 drilled in the valve casing 340, the duct 345 in the valve, the ducts 363 and 364 in the valve casing, the groove 351, duct 346, groove 350, and duct 357. Simultaneously, also, opposite ends of the cylinder 240 will be connected to one another through the valve 332, the duct 368 which is connected with the right hand end of the cylinder 240, being at this time connected with the duct 369 that leads to the left hand end of the cylinder through the ducts 360, 347 and 361 (Fig. 19). The connection of the line 330 with the line 331 in the manner described, causes the pressure fluid to flow directly back to the sump. The connection of the line 334 with the line 335 permits free flow of the motive fluid from one end of the cylinder 256 to the other so that there will be no resistance to movement of the piston 255 in the cylinder 256 during adjustment of the eccentric carrier. The connection of the line 368 with the line 369 permits free flow of the motive fluid from one end of the cylinder 240 to the other so that the piston 330 can be moved freely in its cylinder 240 to adjust the angular position of the cradle.

The positions of the valves 310 and 311 are controlled from cam tracks integral with the feed cam 120. This cam is formed with two peripheral cam tracks which are denoted at 370 and 371, respectively, in Figs. 12, 13 and 21. The projecting stem portion of the valve 310 is held by the spring 382 in engagement with the free end of an arm 372 which is rotatably mounted on a shaft 373. This shaft is journaled in the base of the machine. The arm 372 carries a roller 375 which rides on the trackway 370 of the feed cam 120. The valve 311 is held in engagement with the free end of an oscillatory arm 378 by a spring which is similar to the spring 382. The arm 378 is keyed to the shaft 373. Also keyed to the shaft 373 is an arm 376. This arm carries a roller 377 that is adapted to ride on the cam track 371.

In Figs. 4, 6, and 21, it is assumed that the valve 332 has been adjusted to the position shown in Figs. 14 to 19 inclusive so set-over of cradle and eccentric are in opposite directions as indicated by the arrows 475 and 476 in Fig. 21. The parts are shown in the positions they occupy when the forward roll of the cradle has been completed and the cam 120 has rotated far enough for the roller 375 of the lever 372 to have ridden up on top of the lobe portion 380 of the cam track 370 with the result that the valve 310 will have been moved inwardly against the resistance of the spring 382 (Fig. 12). In this position, then, the pressure fluid will be flowing through the line 316, check valve 317, line 318, and line 326 to the left hand end of the cylinder 240. This causes the piston 230 to be moved to the right, shifting the cradle 51 on its axis. At this time, the right hand end of the cylinder 240 will be on exhaust through the line 325, the valve 310, and the line 328 which leads back to the sump of the machine. When the piston 230 in its rightward travel passes the port for the line 325, a dashpotting effect will be obtained, the exhaust fluid being forced to flow through the restricted passage provided by the duct 368 and the line 400 which connects this duct with the line 325. The piston 230 is shown in a position in Figs. 4 and 21 just before it has completed its rightward travel, that is, while the set-over of the cradle is still being effected.

Fig. 26 illustrates diagrammatically the kind of cut taken by the cutter during the forward roll of the cradle. During this part of the cycle, the cutter cuts from a center 300, which coincides with the axis Z (Fig. 2) of the cutter spindle. At the end of the forward roll, it will have cut in the gear blank G a tooth slot of uniform width from end to end. The bottom of this tooth slot is denoted in Fig. 26 by the shaded portion 301.

During the movement of set-over of the cradle, the center 300 of the cutter is swung about the axis Y of the cradle from position 300 to position 300' (Fig. 27). At the end of the rightward movement of the piston 230, the stop 402 (Figs. 4 and 21), which is carried by the finger 244 and which therefore moves with the piston 230, strikes a pin 403 that is provided on a lever 404. This lever is pivoted at 405 in the base of the machine. The lever is therefore swung about its pivot 405. This causes the contact 406 of the lever, by its engagement with the end of the stem 407 of the valve 336, to force the valve 336 inwardly against the resistance of the spring 408. The lever also carries a contact or lug 410 which simultaneously engages the roller 411 of a normally open limit switch 412, closing this switch. The function of this switch will be described later.

At the time that the valve 336 is moved inwardly, the cam 120 will have rotated far enough for the roller 377 of the compound lever 376—378 to have ridden up on top of the lobe 383 of the cam track 371. This will cause the valve 311 to be shifted inwardly against the resistance of the spring which normally holds it outwardly. The pressure fluid will accordingly flow through the duct 316, check valve 319, line 320, valve 311, line 330, ducts 355, 343, and 356 (Fig. 15) of the valve 332, line 334, the now inwardly shifted valve 336, and the line 338 to the right hand end of the cylinder 256. This will cause the split piston 255 (Figs. 5, 6 and 21) to be moved to the left, rotating the eccentric carrier 56 (Fig. 2) on its axis to shift the center of the cutter from position 300' to the position 300'' (Fig. 27). At this time the left hand end of the cylinder 256 will be on exhaust through the line 337, valve 336, line 335, valve 332, line 331, valve 311, and line 413 which leads back to the sump.

When the piston 255 is moved to the left, a stop 417, which is secured in the arm 278 (Fig. 5), contacts with the lower arm 418 (Figs. 7 and 10) of a double arm lever 419 which is keyed to a shaft 420. This shaft 420 is journaled in the cradle. It has a lever 421 keyed to its outer end. This lever carries a button 422 at its upper end which is adapted to engage the roller 424 of a normally open limit switch 425, to close this switch. The function of this switch will be described later.

When the set-over of both the cradle and the eccentric carrier has been completed, the reverse mechanism of the machine operates and the return roll of the cradle and the work begin. During the return roll, the roller 375 of lever 372 (Fig. 21) rides on the high portion 380 of cam track 370, and the roller 377 of lever 376 rides on the high portion 383 of cam track 371, thus maintaining the valves 310 and 311 in their leftward positions, and keeping the piston 230 at the right hand end of the cylinder 240 and the piston 255 at the left hand end of the cylinder 256. During the return roll, therefore, the cutter will cut from its new center 300'' (Fig. 27), widening out the tooth slot and producing a slot that tapers in width longitudinally. This is illustrated diagrammatically in Fig. 27 where 301' denotes the cut taken in the bottom of a tooth slot of the pinion G during the return roll. As will be noted, the cut 301' overlaps more and more the cut 301, which was taken on the forward roll, as it approaches the small end of the pinion. Thus the desired taper in width of the final tooth slot is obtained.

At the end of the return roll, the cam 120 will have rotated far enough for the roller 375 of the lever 372 to roll down off of the high part 380 of the cam track 370, permitting the valve 310 to be shifted back to the right under actuation of the spring 382 (Fig. 12). This will put the line 325 (Fig. 21) on supply from the line 318 and the piston 230 will be moved to the left to shift the cradle 51 on its axis back to its initial position, ready for the beginning of a new uproll. During this leftward movement of the piston 230, the left-hand end of the cylinder 240 will be on exhaust through the line 326, valve 310, and line 327 that leads back to the sump. Toward the end of this movement, the piston 230 will close the port that leads to the line 326 and the motive fluid will thereafter be compelled to exhaust through the restricted passage provided by the duct 369 and the duct 428 which connects this duct with the line 326. Thus a dashpotting effect will be obtained, cushioning the final part of the leftward movement of the piston 230. The line 369 is at this time otherwise closed by the valve 332 which is in operating position.

During this leftward movement of the piston 230, the contact 402 (Figs. 4 and 21) will move out of engagement with the pin 403 of lever 404, thus allowing the spring 408 to move the valve 336 to the left to the position shown in Figs. 4 and 21. This causes the lever 404 to be swung clockwise about its pivot 405. The movement of valve 336 to the left shuts off communication between the lines 337 and 338 on the one hand and the lines 334 and 335 on the other, thus preventing movement of the piston 255 until the piston 230 has completed its movement. The clockwise movement of the lever 404 swings the contact 410 away from the roller 411 of the normally-open limit switch 412, allowing this switch to open for a purpose to be described later.

At the end of the leftward movement of piston 230, the lug 430 (Figs. 4 and 21) formed on the block 242 will strike the pin 431 of the lever 404. The lever 404 will therefore be again rocked counterclockwise about its pivot 405, to shift the valve 336 inwardly against the resistance of the spring 408 and to close the normally open limit switch 412 again. The inward shift of the valve 336 opens the lines 337 and 338 again to communication with the lines 334 and 335.

A moment after the roller 375 drops off of the lobe 380 of the cam track 370, the roller 377 of the lever 376 will drop off of the lobe 383 of the cam track 371. This will allow the valve 311 to move back to the right, to the position shown in Fig. 21, under actuation of its spring. The pressure fluid will therefore flow from the line 320 through the line 331, ducts 357, 344, and 356 of valve 332 (Fig. 17), line 335, the now inwardly shifted valve 336, and line 337 into the left hand end of the cylinder 256. This moves the piston 255 back to the right to the position shown in Fig. 21, thus shifting the eccentric carrier 56 back to its initial position and completing the shift of the cutter back to its initial position. At this time the motive fluid will exhaust from the right hand end of the cylinder 256 through the line 338, valve 336, line 334, valve 332, line 330, valve 311 and line 414 back to the sump.

As the split piston 255 moves back to the right, the contact 417 (Figs. 6 and 21) moves away from the lower arm 418 of lever 419 (Figs. 7 and 10), allowing the lever 421 to move about its pivot 420. This allows the normally open switch 425 to open. Toward the end of the rightward movement of the piston 255, however, the block 416, which is carried by the rod 415, strikes the upper arm 418' of double-arm lever 419, again rocking lever 421 clockwise about its pivot 420 and again closing limit switch 425. Rod 415 passes through the central bore of shaft 260 and threads into block 248 (Fig. 6) so that it moves with the split piston 255.

During the resetting of the cradle and eccentric, as described, the cam 120 (Fig. 11) will operate to withdraw the sliding base 110 from cutting position. When the work has been withdrawn clear of the cutter, the work will be indexed.

The indexing mechanism forms no part of the present invention but may be of any known type such as, for instance, that employed in the machine of the co-pending application, No. 300,025, filed October 18, 1939. In this indexing mechanism, the housing for the differential gears 190, 191 and 192 (Fig. 20) is held locked during cutting, but is unlocked for indexing. After being unlocked, this housing is rotated by a train of gearing comprising the spur gears 440, 441, 442, 443, the shaft 445, the arm 446 which carries the roller 447, the Geneva wheel 448, with which the roller engages, and the spur gears 449 and 450. Thus an additional movement is imparted to the train of gearing which drives the work spindle to index the work spindle.

When the indexing of the work has been completed, the feed cam 120 operates to return the work again into operative engagement with the cutter to begin the cycle of the operation anew.

The limit switches 412 and 425 already referred to operate in conjunction with a limit switch 455 (Figs. 21 and 12). The limit switch 455 is adapted to be operated by a bell crank lever 456. One arm of this lever carries a roller 457 which is adapted to ride on the track 458 of the feed cam 120 (Figs. 11, 12, 21 to 25 inclusive). This cam track is provided with two lobes 459 and 459'. There is a pin 460 carried in the long arm of the bell crank lever 456. This pin engages a plunger 461 which is arranged to engage and operate the normally open limit switch 455.

Figure 7:
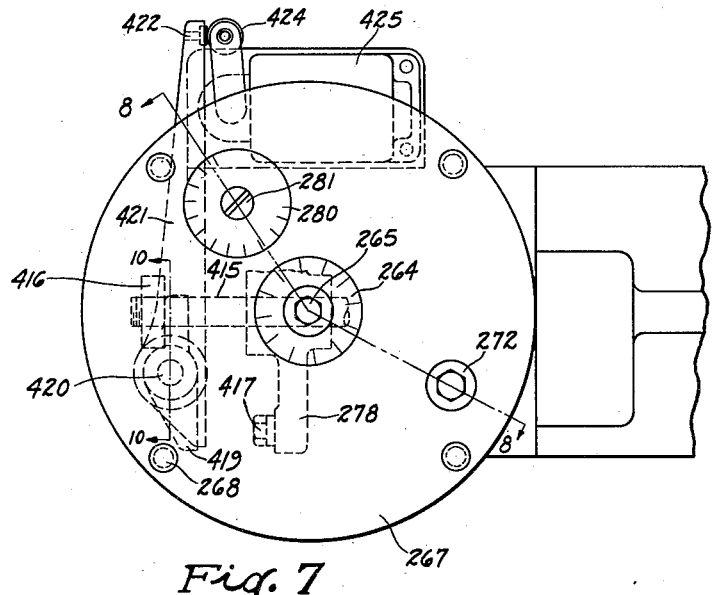
Fig. 7 is a view on an enlarged scale of the means for manually adjusting the amount of shift of the eccentric carrier, and of the limit switch and trip therefor, which prevent reverse roll of the cradle if the eccentric carrier has not been shifted.
Figures 8, 9:
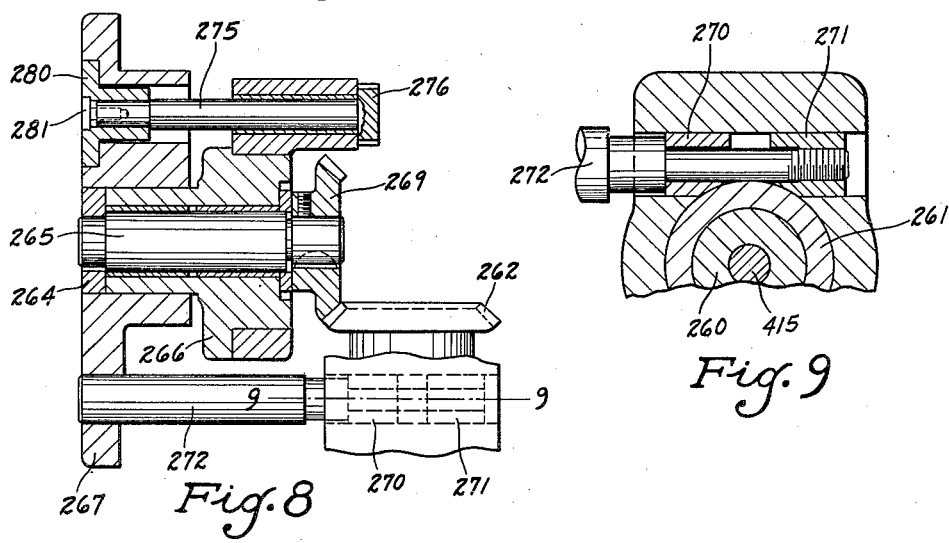
Fig. 8 is a sectional view on the line 8—8 of Fig. 7.
Fig. 9 is a fragmentary sectional view on the line 9—9 of Fig. 8.
Figure 10:
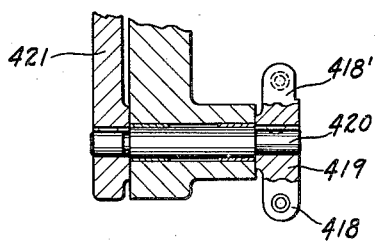
Fig. 10 is a fragmentary sectional view on the line 10—10 of Fig. 7.
Figure 22:
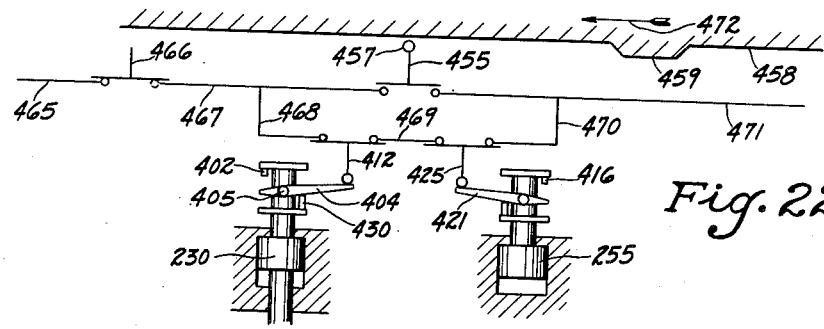

As illustrated diagrammatically in Figs. 22 to 25 inclusive, the limit switches 455, 412 and 425 are incorporated in the operating circuit of the machine. Fig. 22 illustrates the normal operating position on the forward roll of the cradle with the pistons 230 and 255 at the ends of their strokes in one direction. The circuit to the drive motor 65 (Fig. 20) is then maintained from the line 465 through the starter button 466, which is a standard push button, the line 467, the line 468, the limit switch 412, the line 469, the limit switch 425, the line 470 and the line 471. The limit switch 412, at this time, is held closed by the lever 404 through engagement of the stop 430 (Fig. 4) with this lever. The limit switch 425 is, at this time, held closed by the lever 421 through engagement of the block 416 with the lever upper arm 418' of double-armed lever 419 (Figs. 7 and 10).

Figure 23:
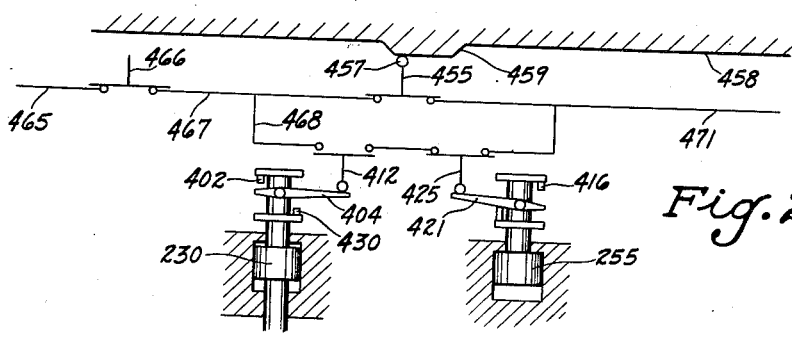

The cam 120 rotates continuously in one direction during operation of the machine as indicated by the arrow 472 in Fig. 22. Just before the piston 230 starts to move to set-over the cradle at the end of the forward roll, as previously described, the lobe 459 of the cam track 458 comes into engagement with the roller 457 of the bell crank lever 456 and closes the limit switch 455. As a result, during the cradle set-over, which is illustrated in Fig. 23, the circuit to the motor 65 is maintained through the limit switch 455 despite the fact that as soon as the piston 230 starts to move, the limit switch 412 opens because the pressure of the stop 430 (Figs. 4 and 21) against the lever 404 is released.

Figure 24:
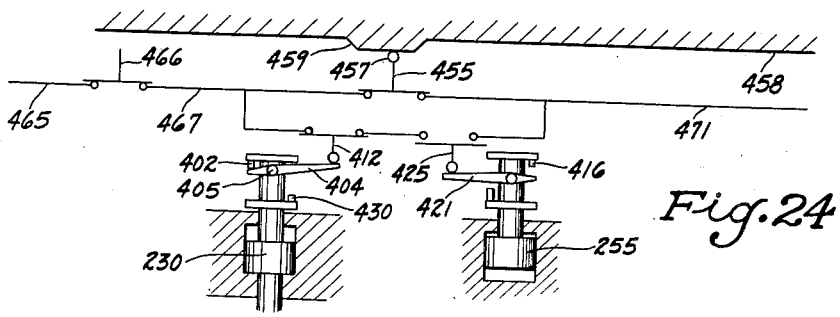

The piston 230 completes the set-over movement of the cradle before the roller 457 has ridden down off of the lobe 459 of cam 458. When the set-over is completed, the lever 404 is again swung about its pivot 405 to close the limit switch 412 through engagement of the stop 402 (Figs. 4 and 21) with the lever 404, and the valve 336 is moved inwardly by the lever 404 as already described. The piston 255 then starts to move carrying the block 416 away from the lever 419 (Figs. 7 and 10). This causes the lever 421 to be swung away from the roller 424 of limit switch 425 and allows the limit switch 425 to fly open, as illustrated in Fig. 24. The circuit to the motor 65 is maintained, however, through the limit switch 455, for the roller 457 (Fig. 21) is still riding on the lobe 459 of the cam track 458.

If the set-over of the eccentric carrier is completed in proper time, then the piston 255 will have reached the end of its stroke before the roller 457 rides down off of the lobe 459 of the cam track 458. Thus, the circuit to the motor 65 may still be maintained through the limit switches 412 and 425 after the roller 457 has ridden off of the lobe 459 of cam track 458.

Figure 25:
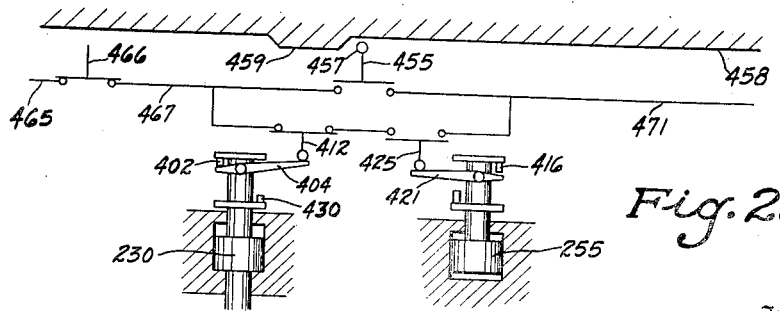

Fig. 25 illustrates diagrammatically what happens if the set-over of the eccentric carrier is not completed in time. The roller 457 has moved down off of the lobe 459 of the cam track 458 and the limit switch 455 has therefore opened. Since the eccentric piston 255 has not completed its stroke, the limit switch 425 will simultaneously be open, for it has not yet been closed by engagement of the stop 416 with the lever 421. The result is that the circuit to the motor 65 will be broken and the drives to cradle, work spindle, and cutter will stop. It will be obvious, therefore, that the several limit switches operate as safety devices preventing cutting on the return roll of the machine should the eccentric set-over and cradle set-over fail to be completed properly in proper time before the return roll begins.

These same limit switches operate to insure that the cradle and eccentric carrier are set back to initial position at the end of the return roll before cutting on a new forward roll begins. Thus the roller 457 will ride up on the lobe 459' of the cam track 458 to close the limit switch 455 before the piston 230 starts to move to shift the cradle back to initial position. The circuit to the motor 65 will therefore be maintained through the limit switch 455 during the movement of the piston 230 for resetting of the cradle, despite the fact that in the resetting movement, the switch 412 will be open since the contact 402 (Figs. 4 and 21) is carried away from the pin 403, allowing the lever 404 to swing away from the roller 411.

At the end of the resetting movement of the cradle, the stop 430 (Figs. 4 and 21) will engage the lever 404 to close the limit switch 412 again, but simultaneously the piston 255 will start to move to reset the eccentric carrier 56, thus causing the block 417 (Figs. 6, 7, and 10) to move away from the lever 419, causing the lever 421 to be swung away from the roller 424, permitting the limit switch 425 to open. If the resetting of the eccentric set-over is completed in proper time, however, the lever 421 will be engaged by the contact 416 again before the roller 457 has ridden down off of the lobe 459' of cam track 458. Hence, the circuit to the motor 65 will be made through the limit switches 412 and 425 before the limit switch 455 is opened. If the resetting of the eccentric is not completed in proper time, however, then the limit switch 455 will be open simultaneously with the limit switch 425 and the drives to the cradle, work spindle, and cutter will stop.

The motor 313 (Fig. 21) is not stopped when the motor 65 is stopped. Hence the pistons 230 and 255 complete their movements at the two ends of the roll even though the motor 65 be stopped. When set-over or resetting are completed, then, the motor 65 can be restarted. If desired, this may be effected automatically by employing a limit switch and relay, the limit switch being closed when the piston 255 has completed its movement.

In the operation as described, the piston 230 moves in the direction of the arrow 475 (Fig. 21) for set-over of the cradle at the end of the forward roll and the piston 255 moves in the direction of the arrow 476 for the set-over of the eccentric at this end of the roll. If it is desired that the set-over of the eccentric at the end of the forward roll be in the same direction as the set-over of the cradle, then the valve 332 (Fig. 21 and Figs. 14 to 19) is rotated 90° on its axis, to move the duct 343 out of registry with the ducts 355 and 356 (Fig. 15) and the duct 344 out of registry with the ducts 357 and 358, and to move the groove 348 into registry with the ducts 355 and 358, the groove 349 into registry with the ducts 356 and 357, as already described. Then the line 331 will be connected with the line 334 and the line 330 with the line 335 so that the piston 255 may move in the same direction as the piston 230 at each end of the generating roll of the cradle.

*Operation of modification shown in Figs. 1 to 27*

The operation of the machine constructed according to the embodiment illustrated in Figs. 1 to 27 inclusive will be obvious from the preceding description, but may be briefly summed up here. The blank is adjusted initially in accordance with the root angle, cone distance, and offset, if any, of the gear to be cut, by adjustment of the plate 105 on the slide 110, of the column 102 on the plate 105, and of the workhead 101 on the column 102. The cutter is also adjusted initially by the adjustment of the eccentric carrier 56 on the cradle 51 and of the cradle 51 on the base 50 to position the cutter relative to the blank in accordance with the spiral angle of the tooth spaces to be cut. In making these adjustments of carrier and cradle, the valve 332 is adjusted at 45° from the position shown in Figs. 14 to 19 to allow free flow of the motive fluid between opposite ends of the cylinders 240 and 256 as already described. Then the valve 332 is adjusted to cutting position, either that of Figs. 14 to 19 or a position at 90° therefrom, depending on whether the carrier 56 is to be set over in a direction opposite to the direction of set-over of the cradle 51 or in the same direction. After all of the adjustments have been made, the machine is started.

The cutter rotates continuously in one direction during operation of the machine, as does also the feed cam 120. The work first feeds into depth through operation of the cam 120 and sliding base 110 (Fig. 11). Then the forward generating roll begins, and the cutter revolves in engagement with the blank while cradle and blank rotate on their respective axes in timed relation, being driven by the gear trains already described and shown in Fig. 20. During the forward roll, if the valve 332 is in the position shown in Figs. 14 to 19, the piston 230 is at the left hand end of its cylinder 240 (Fig. 21) and the piston 255 is at the right hand end of its cylinder 256. These pistons are held in these positions during the whole of the forward roll by pressure in the lines 325 and 337, respectively, so that the cradle worm 225 is held against axial movement and the carrier 56 against shift during cutting. During the forward roll, the valve 336 is held inwardly in its sleeve 339 and the limit-switch 412 is held closed by pressure of the contact 430 on the lever 404. During the forward roll, the limit switch 425 is held closed by engagement of the contact 416 (Figs. 7, 10 and 21) with the upper arm 418' of the lever 419. The circuit to the motor 65, that drives cutter, cradle, and work spindle, is maintained then through the switches 412 and 425 (Figs. 21 and 22). During the forward roll, however, the limit switch 455 is open, for the roller 457 of bell-crank 456 (Figs. 12 and 21) is riding on a dwell portion of cam-track 458. During the forward roll, also, valve 310 is to the right of the position shown in Fig. 21 and valve 311 is in the position shown in Fig. 21, the rollers 375 and 377 riding on the lower portions of the cam tracks 370 and 371. During the forward roll, the cutter will cut from the center 300 (Fig. 26) and at the end of the forward roll, then, will have cut a tooth slot whose sides are generated and which is of uniform width from end to end, as indicated by the shaded portion 301.

At the end of the forward roll, the roller 457 of bell-crank 456 (Fig. 21) will ride up on the lobe 459 of cam track 458, causing the limit switch 455 to be closed. The roller 375 will then ride up on the high part 380 of the cam track 370, shifting valve 310 to the position shown in Fig. 21. This will put the line 326 on supply and the line 325 on exhaust and the piston 230 will be moved to the right, moving the cradle worm 225 to the right and shifting the cradle 51 on its axis. As the piston 230 moves to the right, the contact 430 is disengaged from the lever 404, and the spring 408 behind the valve 336 (Fig. 4) moves the valve outwardly and swings the lever 404 away from the limit switch 412. The movement of the valve 336 outwardly shuts off communication between the lines 334 and 335 on the one hand and the lines 337 and 338 on the other so that the piston 255 cannot move until the piston 230 has completed its movement and the valve 336 is pressed inwardly again. The movement of the lever 404 away from the limit switch 412 permits this limit switch to open, but the circuit to the drive motor is maintained as shown in Fig. 23 through the switch 455 which has previously been closed, as above described. In the set-over of the cradle, the center of the cutter is moved from 300 to 300' (Fig. 27).

At the end of the set-over of the cradle, the contact 402 (Figs. 4 and 21) strikes the pin 403 of lever 404, causing the valve 336 to be moved inwardly again against the resistance of spring 408, again closing limit switch 412. The cam 120 will now have rotated far enough for the roller 377 to ride up on the high part of the cam track 371. This will cause the lever 378 to shift the valve 311 to the left from the position shown in Fig. 21. Thus the right hand end of the cylinder 256 will be put on supply through the line 330, valve 332, line 334, valve 336, and line 338. The piston 255 will, therefore, be moved to the left, setting-over the eccentric carrier 56. As the piston 230 moves to the left, the block 416 (Figs.

6, 7 and 10) will also move to the left, allowing the lever 421 to be rocked counterclockwise and permitting the limit switch 425 to open. The circuit to the drive motor 65 is maintained, however, as shown in Fig. 24, through the limit switch 455 which has previously been closed as above described. Should the set-over of the eccentric carrier not be accomplished in proper time, though, then the roller 457 of bell-crank 456 (Fig. 21) will ride down off of the lobe 459 of cam track 458 before switch 425 is closed, so that switches 455 and 425 will be open simultaneously and the machine will stop. Set-over of the eccentric must then be completed before the machine can be restarted. In the set-over of the eccentric carrier 56, the center of the cutter is moved from 300' to 300'' (Fig. 27). At the end of the set-over of the eccentric carrier, the contact 417 will engage the lever 419 (Figs. 6, 7 and 10), rocking the lever 421 about its pivot to reclose the switch 425.

The reversing mechanism of the machine now operates, and the return generating roll begins. During the return roll, then, work and cradle are driven by the trains of gearing described and shown in Fig. 20 in the opposite direction from the directions of their respective rotations during the forward roll. During the return roll, the roller 375 rides on the high part 380 of cam track 370, and the roller 377 on the high part of cam track 371 (Fig. 21). The piston 230 is, therefore, held at the right hand end of its cylinder 240 (Fig. 21) and the piston 255 at the left hand end of its cylinder 256 by pressure in the lines 326 and 338, respectively. The cradle worm 225 remains, therefore, in axially fixed position during the return roll, and the carrier 56 also remains fixed during the return roll. The cutter C cuts, therefore, from the center 300'' during the return roll. During the return roll, the valve 336 is held inwardly in its sleeve 339 (Figs. 4 and 20) and the limit switch 412 is held closed by pressure of the contact 402 on the lever 404. During the return roll, the limit switch 425 is held closed by engagement of the contact 417 with the lower arm 418 (Figs. 6, 7, and 10) of the lever 419. The circuit to the motor 65, that drives cutter, cradle and work spindle, is maintained through the switches 412 and 425 (Fig. 21).

At the end of the return roll, the cutter C will have cut a tooth slot, whose sides are generated and which is of progressively decreasing width from the large to the small end of the pinion as indicated diagrammatically in Fig. 27. At the end of the return roll, the cam 120 will have rotated far enough for the roller 457 of bell crank 456 (Fig. 21) to ride up on the lobe 459 of cam track 458, closing limit switch 455, and for the roller 375 of lever 372 to ride down onto the low part of cam track 370, allowing valve 310 to move outwardly under pressure of spring 382 (Figs. 21 and 12). The right hand end of cylinder 240 is thus put on supply and the piston 230 is thus moved to the left to move the cradle worm 225 axially, shifting the cradle 51 back to its initial position. In this movement of the piston 230, the switch 412 is first allowed to open by movement of the contact 402 away from the lever 404 and is then closed again by engagement of the contact 430 with the lever 404. In this same movement, the valve 336 is first allowed to move outwardly and is then pushed inwardly again by this same described movement of the lever 404.

When the resetting of the cradle is completed, the cam 120 will have rotated far enough for the roller 377 to ride down onto the low part of cam track 371, allowing valve 311 to return to the position shown in Fig. 21. This will put the left hand end of cylinder 256 on supply and piston 255 will be moved to the right to the position shown in Fig. 21, resetting the carrier 56 to initial position. In this movement, the limit switch 425 will first be allowed to open by movement of the contact 417 to the right and then be closed again by engagement of the contact 416 with lever 419 (Figs. 6, 7, and 10). As before, the limit switches 412 and 425 act as safety devices for, if the resetting of cradle 51 and carrier 56 are not completed in proper time, that is, before the roller 457 (Fig. 21) has ridden down off of the lobe portion 459' of cam track 458, then the motor 65 will be stopped.

During the resetting of the cradle 51 and carrier 56, the cam 120 will have rotated far enough for the track 140 or 141 (Fig. 11), as the case may be, of this cam to move the sliding base 110 rearwardly away from the cutter. The blank G is then indexed by the indexing mechanism of the machine. The sliding base 110 is then fed back, returning the blank into operative engagement with the cutter, ready for the cutting of a new tooth space of the blank. The reverse mechanism of the machine then operates to again reverse the direction of roll of cradle and work spindle, and the forward roll begins anew, with the cutter again cutting from the center 300 (Fig. 26).

The operation of the machine then proceeds in the fashion already described. A tooth slot of uniform width from end to end is roughed out during the forward roll with cutter, cradle and work spindle rotating on their respective axes but with carrier 56 held against movement relative to the cradle and with cradle worm 225 held against axial movement. At the end of the forward roll, the cradle worm is moved axially in one direction to set over the cradle, and the carrier is also set-over. Then the return roll begins. During this return roll, the cutter cuts from a new center eccentric of its original center because of set-over of the cradle and carrier, and thus cuts a taper slot. During the return roll, the carrier is held against movement relative to the cradle and the cradle worm 225 is held against axial movement. Cutter, cradle, and work spindle rotate, however, on their respective axes, but cradle and work spindle rotations are opposite to the directions of their rotation during forward roll. At the end of the return roll, the cradle worm will be shifted axially to reset the cradle to initial position, and the carrier is reset to initial position. During these resetting movements, the work is withdrawn from engagement with the cutter and indexed. Then it is fed back into engagement with the cutter, and the cycle begins anew.

When all of the tooth spaces of the blank have been taper cut, the automatic stop 480 (Fig. 12) is tripped and the machine stopped. This stop may be operated in known manner by the cam 495 through the weighted bell-crank lever 496, the link 497 and bell-crank lever 498. The cam 495 may be fastened to the shaft 168 (Fig. 11) in any suitable manner to make one revolution per cycle of the machine, to advance the stop tripping mechanism a step for each tooth space cut in the gear blank. The valve 152 (Fig. 21) may then be shifted by the hand lever 482 to the left from the position shown in Fig. 21. This puts the line 151 on supply from the line 316 through the check valve 484, the line 485 and the valve 152. Thus the piston 121 (Figs. 11 and 21) will be moved to the left from the position shown in Fig. 11, to withdraw the sliding base 110 and the work from cutting position. During this withdrawal movement of the piston 121, the motive fluid will exhaust from the left hand end of the cylinder 130 through the line 150, the valve 152 and the line 488 which leads back to the sump.

When the completed blank has been removed and a new blank chucked, the sliding base may be returned to operative position to bring the new blank into cutting position by movement of the valve 152 back to the position shown in Fig. 21 through the hand lever 482. This will put the line 150 on supply from the line 485 and the line 151 on exhaust through the line 487 which leads back to the sump. Ducts 489 and 490 may be provided at opposite ends of the cylinder 130 to communicate with the ducts 150 and 151, respectively, through check valves 491 and 492, respectively, and thereby dash-pot the movements of the piston 121. When the work is in operative position, the machine may be started by pressing in the starter button 466 (Fig. 22).

It will be noted that in the machine described, the cradle is moved first at both ends of the roll, that is, it is moved first for set-over as well as first for resetting, and it is only after the cradle has been moved that the set-over or resetting movement of the eccentric carrier begins. This insures against the cutter cutting into the work on either set-over or resetting movement. The cradle movement is about the axis of roll, but the carrier movement is at an angle thereto, and the carrier movement cannot be effected until the cutter has been rolled clear of the blank at either end of the roll.

To reduce the amount of roll required, the tracks 140 and 141 of the cam 120 (Fig. 11) may be so designed that the work is withdrawn out of engagement with the cutter on completion of cutting on the forward roll as well as at the completion of cutting on the return roll. Thus set-over of cradle and carrier at both ends of the roll may be effected with the work withdrawn. The work is returned into engagement with the cutter again as soon as the set-over is completed at the end of the forward roll. It is returned into engagement with the cutter again as soon as resetting and indexing are completed at the end of the return roll.

*Modified machine of Figs. 28 to 37 inclusive*

As has already been stated, in a modified form of this invention, a machine may be built which is capable of generating gears with longitudinally tapering tooth slots by any one of three methods, viz. (1) by the method of operation which is practiced on the machine of Figs. 1 to 27 inclusive, (2) by the method disclosed in the pending application of Ernest Wildhaber, Serial No. 324,827, above mentioned in which a different ratio of roll between work spindle and cradle is employed during forward roll from that employed on the return roll, and (3) by the combination of methods Nos. 1 and 2. A machine built according to this modified form of the invention has the further advantage that not only may the lengthwise tooth shapes be roughed close to finished form but also the profile shapes, for the mechanism for producing the modified roll may be used during forward and return rolls to generate any desired tooth profile shapes.

In Figs. 28 to 37 inclusive, we have shown one way in which the machine of Figs. 1 to 27 inclusive may be modified to permit practice of the three taper-cutting methods above named. In this modified machine, the drive to the cutter, the gear trains for rotating work spindle and cradle worm, the indexing mechanism, the feed cam and its drive, and the operative connection between feed-cam and sliding base, and the means for setting over the eccentric carrier 56 are the same as in the first described embodiment of our invention. Only the means for shifting the cradle worm, the valving for controlling the relative movements of eccentric carrier and cradle worm, and the safety devices for insuring completion of set-over of cradle and carrier or resetting thereof before reversal of roll have been changed.

For reciprocating the cradle worm 225 axially in the modified form of machine, the mechanism at the left hand side of Fig. 4 is entirely eliminated and instead a mechanism such as shown in Figs. 28 and 29 is employed. In the modified machine, the cradle worm shaft 224 is journaled at its left hand side in a bearing 520 which is secured against axial movement relative to the shaft by the nut 521. The reduced end of the shaft 224 projects through an opening in one end of the piston 522 and the bearing 520 is mounted within this piston 522. The opposite end of this piston is closed by the piston rod 523 which threads into the piston.

The piston reciprocates in a cylinder 525, and the piston rod 523 extends through an opening in one end wall of this cylinder. It is secured by the nut 526 to a bracket 527 which is secured in any suitable manner to a slide 528 (Figs. 29 and 31).

The slide 528 reciprocates in guideways 530 formed in the casting 531. The slide 528 is held in these guideways by the gibs 532 and 533. Integral with the slide 528 is a block 535 and mounted on this slide for adjustment thereon toward and from the block 535 is an adjustable block 536. This adjustment is effected by rotation of a screw shaft 537 which threads into the block 536. The block 536 is guided in its adjustment by gibs 552 and 553 which are secured in any suitable manner to the slide 528. The gib 532 is graduated, as shown in Fig. 32, and the slide 536 carries an index marker 554 which may be read against these graduations to permit the slide 536 to be adjusted precisely.

Slidably mounted in the fixed block 535 is a headed contact member 538, and slidably mounted in the adjustable block 536 is a headed contact member 539. These members have stem parts 545 and 546, respectively, which slide in the blocks 535 and 536, respectively.

Pivotally mounted in the fixed block 535 on a pin 540 (Figs. 31 to 34) is a lever 541. Pivotally mounted in the adjustable block 536 on a pin 542 is a lever 543. The lever 541 is bifurcated at is pivot end and its furcations fit into recesses formed in opposite sides of the stem part 545 of the contact member 538, as clearly shown in Fig. 29. The lever 543 is similarly bifurcated at its pivot end and similarly straddles the stem part 546 of the contact member 539, its furcations being received in recesses formed in opposite sides of this stem part 546. The structure is such that axial movement of either contact member 538 or 539 causes pivotal movement of the corresponding lever 541 or 543.

The free ends of the levers 541 and 543 contact with the ledge portions 547 (Fig. 33) of trip members 549 and 550, respectively. These trip members are pivotally mounted upon a pin 551 which is secured in the gib 533.

There is a valve 555 (Figs. 30 and 34) mounted in the casting 531 directly behind the two trip members 549 and 550 in such way, as illustrated diagrammatically in Fig. 34, that the two trip members may overlap the projecting end of the stem 556 of this valve so that when either trip member is moved rearwardly, the valve is pushed inwardly against the resistance of the spring 557 (Fig. 30). The purpose of this valve will appear hereinafter. The trip member 549 is also adapted to engage the projecting end of a rod 558 (Figs. 33 and 31) which is slidable in the casting 531 and which contacts with the normally open limit switch 560 in such way that when the rod is pushed inwardly by the trip member 549, the limit switch is closed. Similarly, the trip member 549 engages a rod 561 (Fig. 32) which is adapted to close the normally open limit switch 562 when the rod 561 is pushed inwardly by the trip member 550. The purpose of the limit switches 560 and 562 will appear hereinafter.

The contact members 538 and 539 are adapted to engage with rollers 570 and 571, respectively (Figs. 29 and 34). These rollers are mounted upon studs 572 and 573, respectively, which are eccentric of but integral with the studs 574 and 575, respectively. The posts 574 and 575 are rotatably adjustable in an oscillatory member 576 which is journaled on bearings 577 and 578 in a casting 579. The casting 579 (Fig. 31) is secured by screws 580 and 581 to the casting 531. The studs 574 and 575 (Fig. 29) are held fixedly in the oscillatory member 576 during operation of the machine, but may be rotated, to adjust the relative positions of the rollers 570 and 571, by opening up the clutches 582 and 583. The inner member of each clutch is secured in any suitable manner to the plate 584 which, in turn, is secured in any suitable manner to the oscillatory member 576. The outer member of each clutch is graduated, as clearly shown with reference to the outer member of clutch 582 in Fig. 29, and the graduations of each outer clutch member may be read against a pointer, such as denoted at 602 in Fig. 29, in order to permit setting the roller precisely. The oscillatory member 576 is rotatably adjustable, and for making this adjustment precisely, the plate 584 is graduated to read against a pointer 603 (Fig. 28). By adjusting the studs 574 and 575, and by adjusting the member 576, the radial and angular positions of the rollers 570 and 571 about the axis of the member 576 can be adjusted to control the amount and character of the modification of roll during roll in opposite directions. Nuts 604 and 604' serve to lock the clutch members 582 and 583, respectively, after adjustment of the studs 574 and 575.

The member 576 is driven from the cradle worm shaft 224 in time with the generating rotation of this shaft. There is a spur gear 585 integral with the sleeve 222 which has a splined connection with the shaft 224. This spur gear 585 meshes with a spur gear 586 which is keyed to a shaft 587 which is journaled in the base of the machine parallel to the cradle worm shaft 224. The shaft 587 carries a bevel gear 588 which meshes with the bevel gear 589. This bevel gear 589 is keyed to a shaft 590 which is journaled in the casting 579. There is a spur gear 591 keyed to the outer end of this shaft 590. This spur gear meshes with a spur gear 592 which is keyed to a post 593 that is journaled in a quadrant 594 which is adjustably mounted on the casting 579. Keyed to the post 593 is a second spur gear 595 which meshes with a spur gear 596 that is connectable by means of the clutch 597 with a shaft 598. There is a worm 599 keyed to this shaft 598. This worm meshes with a worm wheel 600 which is integral with the rotary member 576. It will be seen that through the drive described, the member 576 will be rotated in one direction or the other depending upon the direction of rotation of the cradle worm shaft 224, and that this rotation will be in time with the rotation of the cradle worm shaft.

During roll of the cradle 51 in one direction, the contact member 538 is held in engagement with the roller 570, while during roll of the cradle in the opposite direction, the contact member 539 is held in engagement with the roller 571. The roller, which is in operative position during either roll, depends, of course, upon the direction of application of fluid pressure to the piston 522. Thus, during roll in either direction, the cradle worm 225 may be moved axially, the direction of its axial movement depending upon the direction of oscillation of the carrier 576. This axial motion imparts an added movement to the wormwheel 226 and to the cradle over and above the motion imparted by rotation of the worm 225, so that the ratio of roll of work and cradle is varied during roll in both directions. The described axial motion of the cradle worm is a motion that occurs during actual cutting and is separate and distinct from the motion of setover of the cradle worm which may be used, as in the machine of the previously described embodiment of the invention, to change the position of the cutter-center at the ends of the generating roll.

The set-over and resetting movements of the piston 522 at opposite ends of the roll are controlled by the valve 310 (Fig. 21) in the same way as the movements of the piston 230 are controlled by the valve 310 in the first described embodiment of my invention. As already stated, the eccentric carrier is set over and reset by movement of the piston 255 as in the first described embdoiment of the invention, and the movements of the piston are controlled primarily by the valve 311 as in the first described embodiment of the invention.

The valve 555 (Figs. 30 and 34) serves the same purpose which is served by the valve 336 (Fig. 21) in the first described embodiment of the invention. It interlocks the movements of the pistons 522 and 255 so that set-over or resetting movement of the piston 255 cannot occur at opposite ends of the roll until the piston 522 has completed its corresponding movement. As already stated, the valve 555 is normally pressed outwardly by the spring 557, but it is held inwardly during forward and return rolls by one or the other of the trip members 549 and 550.

The modified form of machine is arranged so that the cradle may move either in a counterclockwise or in a clockwise direction for the forward roll. For determining the direction of forward roll, a slidably adjustable valve 605 (Figs. 29 and 34) is provided. This valve is also rotatably adjustable to permit free flow of the motive fluid between opposite ends of the cylinder 525 and between opposite ends of the cylinder 256 in initially adjusting the spiral angle setting of the cutter. The direction of set-over movement of the piston 255 relative to the direction of setover movement of the piston 522 is controlled by the manually rotatable valve 640.

The valve 605 is mounted to be slidably adjustable in the direction of its length in the sleeve 606. This sleeve in turn is mounted in the casting 607 which is secured to the base of the machine. The valve is shown in Figs. 29 and 34 in the position which it occupies when the first cut in the blank is to be taken on the uproll or counterclockwise movement of the cradle. If the first cut is to be taken on the downroll or clockwise movement of the cradle, then the valve is pulled outwardly by the knob 608 as will be described in more detail later.

The manually rotatable valve 640 (Fig. 34) which controls the direction of shift of the carrier 56 relative to the direction of movement of the cradle at the ends of the roll, has two holes or ducts 641 and 642 spaced longitudinally from one another and drilled parallel to one another diametrically through the valve. In addition, the valve is provided with two peripheral grooves 643 which are formed in the periphery of the valve 180° apart and which extend longitudinally of the valve for a substantial portion of its length. In the position shown in Fig. 34, the duct 642 of the valve connects the ducts 645 and 646, and the duct 641 of the valve connects the ducts 647 and 648. When the valve is turned in its housing 644 through an angle of 90° from the position shown in Fig. 34, then the duct 645 is connected to the duct 648 by one of the grooves 643, and the duct 647 is connected to the duct 646 by the other groove 643. Thus it will be seen that by rotatably adjusting the valve 640, the direction of the movement of the eccentric piston 255 relative to the movement of the cradle piston 522 may be predetermined.

In the position of the parts shown in Fig. 34, the line 326 is on supply, having been put on supply at the end of the uproll, by movement of the valve 310 to the position shown in Fig. 21. The pressure fluid then flows from the line 326 through the ports 610 and 611 of the valve 605, the line 612, the ports 613 and 614 of the valve 555, and the line 617 to the left hand of the cylinder 525. This causes the piston 522 to be moved to the right to shift the cradle on its axis. At this time, the exhaust from the right hand end of the cylinder 525 is through the line 620, the ports 621 and 622 of the valve 555, the line 623, the ports 624 and 625 of the valve 605, the line 325 and the line 328 (Fig. 21) back to the sump.

In this shifting movement of the piston 522, the contact member 538 is moved out of engagement with the roller 570 and the contact member 539 is brought into engagement with the roller 571, as shown in Fig. 34. When the contact member 538 is disengaged from the roller 570, the lever 541 is left free to swing about its pivot 540, and the spring 557 (Fig. 30) therefore moves the valve 555 (Figs. 30 and 34) temporarily outwardly. This closes off the lines 645 and 647 that flow to the piston 255, thus holding the carrier 56 against movement until shift of the piston 522 has been completed. At this moment, also, the rod 561 (Fig. 32) is disengaged from the limit switch 562. As soon as the contact member 539 is brought into engagement with the roller 571, however, the lever 543 is rocked about its pivot 542. This rocks the trip member 549 about the pivot pin 551 so that the valve 555 is pushed inwardly again and the rod 558 is also pushed inwardly to close the limit switch 560.

Shortly after the valve 310 is pushed to the position shown in Fig. 21, the roller 377 rides up on the high part 383 of cam track 371 and the valve 311 is pushed to the left (Fig. 21). This puts the line 330 on supply. The pressure fluid then flows through the ports 650 and 651 (Fig. 34) of the valve 605, the line 652, the line 653, the ports 654 and 655 of the valve 555, the line 647, the duct 641 of valve 640, and the line 648 to the right hand end of the cylinder 256 to move the piston 255 to the left. This causes the eccentric carrier 56 to be shifted on its axis, completing the shifting of the cutter position. At this time the left hand end of the cylinder 256 is on exhaust through the line 646, the duct 642 of valve 640, the line 645, the ports 664 and 663 of valve 555, the line 662, the ports 661 and 660 of valve 605, the line 331, valve 311 (Fig. 21) and line 413 back to the sump. In this shifting movement of the piston 255, the limit switch 425 (Fig. 21) will first be allowed to open by movement of the stop 416 away from the lever 419 (Figs. 7 and 10) and will then be closed again by engagement of the stop 417 with the lever 419 as in the first described embodiment of the invention.

The reversing mechanism of the machine then comes into operation and the return roll begins. Throughout the whole return roll, the valve 555 (Fig. 34) is held in its inward position by the arm 549 and the limit switches 560 and 425 (Fig. 21) are held closed. At the end of the return roll, the roller 375 of the lever 372 rides down off of the high part of the cam 370 and the valve 310 moves back to the right from the position shown in Fig. 21. This puts the line 325 on supply from the line 318. The pressure fluid then flows through the ports 625 and 624 of the valve 605, the line 623, the ports 622 and 621 of the valve 555, and the line 620 to the right hand end of the cylinder 525, moving the piston 522 back to the left to rotate the cradle 51 accordingly and reset the cradle to initial position. At this time, the left hand end of the cylinder 525 is on exhaust through the line 617, the ports 614 and 613 of the valve 555, the ports 611 and 610 of the valve 605, the line 326, the valve 310 and line 327 which leads back to the sump. In the resetting movement of the cradle, the piston 522 moves the contact member 539 out of engagement with the roller 571 and brings the contact member 538 into engagement with the roller 570. In this movement, also, the valve 555 is temporarily released by the arm 549. When the contact member 538 engages the roller 570, however, the stem portion 545 of the contact member 538 is pushed to the right. This rocks the arm 541 about its pivot 540, causing the trip member 550 to be rocked on its hinge 551. This causes the valve 555 to be pushed in again against the resistance of spring 557 (Fig. 30), and at the same time it causes the limit switch 562 to be closed by the rod 561.

A moment after this has occurred, the roller 377 (Fig. 21) of the lever 378 rolls down off of the high part of the cam 371, causing the valve 311 to be shifted back to the right to the position shown in Fig. 21. This puts the line 331 on supply from the line 320, and the pressure fluid flows through the ports 660 and 661 of the valve 605, the line 662, the ports 663 and 664 of the valve 555, the line 645, the duct 642 of valve 640, and the line 646 to the left hand end of the piston 255. At this same time, the right hand end of the cylinder 256 is put on exhaust through the line 648, duct 641 of valve 640, line 647, ports 655 and 654 of valve 555, line 653, line 652, ports 651 and 650 of valve 605, line 330, valve 311 (Fig. 21) and line 414 back to the sump. Thus the piston 255 is moved back to the right to return the eccentric carrier 56 and the cutter to initial positions. As the piston moves over to the right it carries the stop 417 (Figs. 21, 7 and 10) away from the lever 419, allowing the limit switch 425 to open, but when the stop 416 comes into engagement with the lever 419, the limit switch 425 is closed again.

During the resetting of the cradle and eccentric carrier, the sliding base 110 will have been withdrawn by cam 120 (Fig. 11) and the blank indexed. At the end of the resetting movement, the work will be fed back into engagement with the cutter, and the reversing mechanism will then operate to start the uproll anew to cut a new tooth space of the blank.

The valve 605 is shown in its inward position. In this position, as described, the first cut takes place on the uproll. If the valve 605 is moved outwardly, then the line 330 will communicate with the line 662 instead of with the line 652, which leads into the line 653, and the line 331 will communicate with the line 670 which leads into the line 653. Thus, the direction of movement of the piston 255 for a given position of the valve 311 will be directly opposite to the direction of movement of said piston for said position of the valve 311 when the valve 605 is in its inward position. Likewise, outward movement of the valve 605 will cause the line 326 to communicate with the line 623 and the line 325 to communicate with the line 671 which leads into the line 612. Thus the direction of movement of the piston 522 for a given position of the valve 310 will be directly opposite to the direction of movement of said piston for said position of the valve 310 when the valve 605 is in its inward position. Thus when the valve 605 is adjusted to its outer position, the first cut into the blank will be taken on the down roll.

The valve 605 is provided with two longitudinal peripheral grooves 673 which are 180° apart, with two longitudinal peripheral grooves 674 which are also 180° apart, with two longitudinal peripheral grooves 675 which are also 180° apart, and with two longitudinal peripheral grooves 676 which are also 180° apart. In the position of the valve 605 shown in Fig. 34, these grooves are in inoperative position. When the valve is rotated through an angle of 45°, however, from the position shown in Fig. 34, the grooves 673 register with the ports 625 and 677, while the grooves 674 register with the ports 611 and 671 and the grooves 675 register with the ports 660 and 671. This permits the motive fluid to flow freely from one end of the piston 522 to the other end thereof and from one end of the piston 255 to the other end thereof, so that both the cradle and the eccentric carrier can readily be adjusted prior to cutting of a gear blank.

When the valve 605 is in its outer position, the valve may also be rotated 45° from the angular position shown in Fig. 34 to allow free flow of the motive fluid between opposite ends of the piston 522 and opposite ends of the piston 255. Then the grooves 676 register with the ports 650 and 651, the grooves 675 register with the ports 611 and 671, and the grooves 674 register with the ports 610 and 624. Hence, again ready adjustment of the initial positions of cradle and eccentric carrier can be made.

The two limit switches 560 and 562 are double-throw switches and operate in conjunction with the limit switches 425 and 455 (Fig. 21) to prevent return roll of the cradle unless the cradle and eccentric carrier have been set-over at the end of the forward roll, and to insure that the cradle and eccentric carrier have been returned to initial position at the end of the return roll before a new forward roll begins.

Fig. 35 illustrates diagrammatically the positions of the parts during the uproll. Here the roller 570 is in contact with the member 538 so that the limit switch 562 is held closed, bridging the contact points 680 and 681. The limit switch 425 is also held closed by the lever 421. The switch 560 is at this time spring-pressed to its normal position, bridging the contact points 682 and 683. The circuit to the drive motor 65 is therefore maintained through the start button 466, the line 685, the line 686, switch 562, the line 687, the switch 560, the line 688, the switch 425, the line 689 and the line 471.

When the piston 522 is shifted to the right at the end of the uproll, the contact member 538 is moved away from the roller 570 and the contact member 539 is brought into engagement with the roller 571, as illustrated diagrammatically in Fig. 36. When the contact member 538 is moved out of engagement with the roller 570, the switch 562 is shifted by spring pressure so as to make contact at the points 690 and 691. But until the contact member 539 has been moved into engagement with the roller 571, the switch 560 maintains its contact at the points 682 and 683. Just prior to the shift of the piston 522, however, the roller 457 of the limit switch 455 will have ridden up on the lobe 459 of the cam track 458, and the circuit to the motor 65 will be maintained through the starter button 466, the line 467, the switch 455 and the line 471.

On completion of the set-over movement of the cradle, the contact member 539 will engage the roller 571 and the switch 560 will be moved in to make contact across the points 692 and 693. This position is shown diagrammatically in Fig. 36. The eccentric piston 255 will then start to move to shift the eccentric carrier 56. This will cause the switch 425 to open, as shown in Fig. 37. The circuit to the motor 65 will be maintained, however, through the starter button 466, the line 467, the switch 455, and the line 471, the roller 457 still moving on the lobe 459 of the cam 458. When the eccentric piston 255 completes its movement, the stop 417 will engage the lever 419 and cause the lever 421 to reclose the switch 425 so that the circuit to the drive motor 65 is maintained once more through the switches 560 and 425, even after the roller 457 has dropped down off of the lobe 459 on to the dwell portion of the cam 458.

If the eccentric piston 255 fails to complete its movement before the roller 457 has dropped off of the lobe 459 of the cam 458, the machine will be stopped, for the circuit will remain broken at the switch 425 and will also then be broken at the switch 455. If the gap between the two contact members 538 and 539 should be too small, then the limit switch 562 would be held in contact with the points 680 and 681 while the limit switch 560 is held in contact with the points 692 and 693. Hence the machine will stop when the roller 457 is riding on the dwell portions of the cam 458.

Various methods of operation of machine of Figs. 28 to 37 inclusive

As has already been stated, the modified form of machine may be employed in various ways. For instance, it may be used to practice the method of the Wildhaber application No. 324,827. In the process of this application, the taper-cut is obtained by using a different ratio of roll on the forward generating movement from that employed on the return generating movement. The principles of this process are illustrated diagrammatically in Figs. 38 and 39. Here 500 denotes the spiral bevel pinion which is to be cut. 501 is its axis and 502 its apex. 505 denotes the face-mill cutter which is to be employed in the generation of the tooth surfaces of the pinion, and 506 and 507 denote opposite side cutting edges of this cutter. The pinion is, of course, inclined to the cutting plane of the cutter by its root angle or by any other suitable angle in order to obtain teeth tapering in depth from end to end. This angular adjustment of the pinion is indicated by the projection of the pinion axis 501 in Fig. 39.

It is assumed that the cutter starts cutting at the small end of a tooth space of the pinion with the axis of the cutter in the position 508 (Fig. 38). The cutter is first fed into depth, moving from the dotted line position 505' (Fig. 39) at the left hand side of Fig. 38 to the full line position denoted at 505. 500' here denotes a fragmentary section through the pinion blank adjacent the small end of the blank.

When the cutter has reached full depth position, the forward generating roll is started. In this forward generating movement, the work rotates on its axis 501 and simultaneously the cutter is moved relative to the work about the axis 502 of the basic generating gear of which the cutter represents a tooth. During roll in one direction, the work rotates angularly from a position, such as denoted at 500' in Fig. 39, where the cutter is cutting at the small end of a tooth space, to a position, such as denoted at 500'' where the cutter has completed its cut on one side 510 of the tooth space at the large end thereof. During this movement of the work, the cutter moves simultaneously through the angular distance 511 from the position 505 to the position 505'', its axis moving about the axis Y of the cradle from the position 508 to the position 508'' (Fig. 38). Thus during the forward roll, the cutting edges 506 of the cutter generate the convex side 510 of the pinion tooth space for the whole length of the tooth space from the small to the large end thereof, and the cutting edges 507 of the cutter generate the concave surface 512 of the opposite side of the tooth space from the small to the large end thereof.

By proper selection of the ratio of roll, the side 510 of the tooth space may be made to very closely approximate the shape of the finished longitudinally convex surface desired. In fact, there need only be left on that side of the tooth space, the amount of stock required for a light finish cut. The opposite side 512 of the tooth slot will, however, depart considerably from the desired finished tooth form, lacking the necessary taper, etc.

The cutter is then shifted about the axis of the cradle to move it from the position 505'' (Fig. 39) to the position indicated in dotted lines at 505₁. The cutter is then at a distance 513 from its starting point. In this shift of the cutter relative to the tooth slot, the axis of the cutter moves from the position 508'' to the position 508₁ (Fig. 38). The return roll of cutter and blank then takes place.

In the return roll, the work rotates through the same angle as during the uproll, but the cutter has to move back through the distance 513 which is greater than the distance 511 of its movement on the uproll. Thus, a different ratio of roll must be employed on the return roll from that used on the uproll. During the return roll, the side cutting edges 507 of the cutter remove stock from the concave side of the tooth slot between the lines 512 and 514, completing the roughing of a tooth space of the pinion to a desired lengthwise taper in width.

At the completion of the return roll, the cutter is withdrawn from engagement with the work and the work indexed to bring a new tooth space into position to be cut.

To practice the process of the above mentioned Wildhaber application on a machine built according to the modification shown in Figs. 28 to 37, the rollers 570 and 571 (Figs. 29 and 34) are adjusted to the required angular and radial positions about the axis of the member 576 by rotary adjustment of the member 576 and rotary adjustment of the studs 574 and 575, so that as the member 576 rotates during the forward roll it will impart a different axial movement to the cradle worm 225 from that which it imparts on the return roll, whereby the desired difference in ratio of roll on forward and return rolls, respectively, will be obtained.

When the machine operates directly according to the principles illustrated in Figs. 38 and 39, no set-over of the eccentric carrier 56 is required and this carrier remains stationary on the cradle during the whole cutting operation. It is only adjusted for spiral angle setting of the cutter, and then fixed. For fixing the eccentric carrier against movement during cutting, the parts 251 and 252 of the piston 255 (Figs. 6 and 21) are adjusted away from one another by rotation of the shaft 260 so that the piston 255 is of the same length as the inside length of the cylinder and therefore cannot move in the cylinder, but will remain stationary during the whole of the cutting operation.

The work is, of course, adjusted in accordance with the cone angle, cone distance and offset required, and the piston rod 122 (Fig. 11) is adjusted in block 123 in accordance with the tooth depth desired, all as in the first described embodiment of the invention.

In the cutting operation, the work is fed into depth by the cam 120 (Fig. 11) and then the forward roll begins. In the forward roll, one or other of the contact members 538 or 539 (Figs. 29 and 34) is held against a roller 570 or 571 by hydraulic pressure on the piston 522. Therefore during the forward roll, the blank rotates at a uniform velocity on its axis under actuation of the generating gear train disclosed in Fig. 20, the cradle worm shaft 224 is driven at a uniform velocity under actuation of the generating gear train disclosed in Fig. 20, and the cradle worm shaft 224 is simultaneously moved axially at a non-uniform velocity under the actuation of the rotary member 576 (Figs. 28, 29 and 34) which, as described, is driven from the cradle worm shaft 224 at a uniform velocity in time with the rotation of that shaft. In the arrangement shown in the drawings, the motion of the rotary member 576 is transmitted to the cradle worm shaft through roller 570 which is in engagement with the contact member 538 during the forward roll. Thus an axial motion at a varying velocity is superimposed on the rotary motion at a uniform velocity of the cradle worm shaft 224, with the result that the cradle is moved about its axis at a non-uniform velocity while the work is rotating at a uniform velocity. Thus during the forward roll, the cutter generates a tooth space of uniform width from end to end which has sides of modified profile shape depending on the axial motion imparted to the cradle worm. At the end of the forward roll, the cradle worm shaft is shifted axially by movement of the piston 522 through operation of the valve 310 (Fig. 21) and the hydraulic mechanism disclosed in Fig. 34 as already described. This shift of the piston 522, shifts the cradle 51 on its axis, causing a shift of the cutter center from position 505'' to position 505$_1$ such as described with reference to Figs. 38 and 39. It also moves the contact member 538 (Figs. 29 and 34) away from the roller 570 and brings the contact member 539 into engagement with the roller 571 (Fig. 36). Then the reversing mechanism of the machine operates and the return roll begins. During the return roll, the work rotates on its axis at a uniform velocity but in the opposite direction from the forward roll, the cradle worm shaft 224 is driven at a uniform velocity but in the opposite direction from the forward roll, and the member 576 is driven at a uniform velocity from the worm shaft 224 but in the opposite direction from the forward roll. The motion of the member 576 during the return roll is imparted to the cradle worm shaft 224, however, through roller 571 and contact member 539. Hence, the cradle worm shaft 224 is moved axially at a different rate on the return roll from its rate of movement on the forward roll. Thus the ratio of cradle movement to work rotation will be different on the return roll from the ratio on the forward roll. Thus during the return roll one side especially of the tooth slot will be recut to the desired profile shape and the slot cut to lengthwise tapering form according to the principles described with reference to Figs. 38 and 39. At the end of the return roll, the blank will be withdrawn and indexed and the piston 522 will be set back to initial position, returning the contact member 538 into engagement with the roller 570. Then the blank will be fed back into engagement with the cutter, and the forward roll will begin anew to cut a new tooth space in the blank.

For cutting gears of low or zero spiral angle, it is desirable to employ not only different ratios of roll on the forward and return rolls but also a set-over of the eccentric carrier as well as of the cradle. This method of operation is illustrated diagrammatically in Fig. 40. Here 630 denotes a developed section of the bevel pinion which is to be cut. The axis of this pinion is indicated at 631 and its apex at 632. 633 denotes the position of the cutter at the middle of the uproll. The axis of the cutter is then at the position 634. Cutter and blank roll together during the uproll as in the previously described embodiment of the invention, but at the end of the uproll, the cutter is shifted by shift of the cradle 51 and eccentric carrier 56. In the shift of the cradle, the cutter center moves from 634 to 634' about the axis Y of the cradle. In the shift of the eccentric carrier, the cutter axis moves from the position 634' to the position 634'', the center of the cutter being swung about the axis X of the eccentric carrier. The cutter, therefore, assumes the position indicated in dotted lines at 633'. It cuts in this position during the return roll with a ratio of roll different from that employed during the uproll according to the principle previously described with reference to Figs. 38 and 39. Thus, a taper slot is cut. The amount of shift of the cutter center is determined by the taper of the tooth spaces desired, since the change in ratio of roll serves, for a pinion of zero spiral angle, primarily as a means of controlling the shape of the tooth profiles.

For cutting gears according to the principle illustrated in Fig. 40, the same motions may be employed as in the machine when operating according to the principles described with reference to Figs. 38 and 39 with the addition that, as described, the eccentric carrier is set over at the end of the forward and reset at the end of the return roll. This is effected as previously described by operation of the piston 255 (Fig. 34).

A machine built according to the second described embodiment of the invention may also be operated according to the principle illustrated diagrammatically in Figs. 26 and 27, where the taper-cut is obtained solely by set-over of the cutter at the end of the forward roll. For this purpose, the clutch 597 (Fig. 28) will be opened so that the drive to the member 576 (Fig. 29) will be disconnected. Then there will be no axial movement imparted to the cradle worm shaft 224 during actual cutting, and the only axial movement imparted to this shaft will be that produced at the ends of the roll by movement of the piston 522 for set-over and resetting of the cradle. The machine will then operate in exactly the same manner as the machine of the first described embodiment of the invention.

*Modification of Figs. 41 and 42*

A modification of the mechanism for transmitting axial motion to the cradle worm during cutting is illustrated in Figs. 41 and 42. Here cams instead of rollers are employed.

There is a bracket 700 secured to the rod 523 of the piston 522. This bracket has a slide 701 fastened to it which is adapted to slide in gibs 702 and 703. Mounted in the slide 701 is a stud 704 on which is mounted a roller 705. Adjustably mounted on the slide 701 is a second slide 706, and mounted on this slide is a roller 707.

The slide 706 is adjusted on the slide 701 by means of a screw 708 which is journaled in the slide 701 and which threads into the slide 706. The slide 706 slides in gibs 713 and 714 which are secured to the slide 701. The gib 713 has a graduated plate 719 secured to it in any suitable manner, and the slide 706 has a vernier 729 secured to it in any suitable manner. The vernier may be read against the graduations of the plate 719 to permit adjusting the slide 706 on the slide 701 for adjusting the distance between the rollers 705 and 707.

The roller 705 is adapted to engage a lever 709 which is pivoted at 710 in the slide 701. The roller 707 is adapted to engage a lever 711 which is pivoted at 712 in the slide 706.

The levers 709 and 711 are like the levers 541 and 543 previously described. They engage ledges formed on trip-arms 715 and 716, respectively, that are pivoted on pins 717 and 718, respectively, in the gib 703. The arms 715 and 716 are adapted to trip the limit switches 560 and 562 and the valve 555 (Fig. 34) in the same manner as do the levers 541 and 543 in the second described embodiment of the invention.

The roller 705 is adapted to engage a cam 720 and the roller 707 is adapted to engage a cam 721. These two cams are secured by a bolt 722 to a rotary member 723. This rotary member is similar to the rotary member 576 (Fig. 29). It is journaled on bearings 724 and 725 in a casting 726 which is secured to the slide 701. There is a worm wheel 727 integral with this rotary member 723 and this wormwheel may be driven to rotate the member 723 through a train of gearing similar to that which drives the wormwheel 600 of the rotary member 576.

During the uproll of the machine, the cam 720 is in engagement with the roller 705 and the axial movement of the cradle worm shaft 224 is controlled by the contour of the cam 720. At the end of the uproll, the piston 522 is shifted as in the previously described embodiment of the invention to bring the roller 707 into contact with the cam 721. During the return roll, then, this latter cam controls the axial movement of the cradle worm shaft.

The cams 720 and 721 may be of any suitable shape. When the mechanism of Figs. 28 to 37 is used, a modification in ratio of relative roll of cutter and blank is effected continuously during cutting, for the rollers 570 and 571 are mounted eccentrically of the axis of rotary member 576 and therefore impart motion at varying velocity to the cradle worm shaft 224. This motion is desirable where it is desired to cut tooth profiles different from true involute shape. Where it is desired to cut teeth of true involute profile shape, then, a mechanism such as shown in Figs. 41 and 42 may be used. The cams 720 and 721 can be designed to transmit uniform axial motion to the cradle worm shaft 224 during cutting. The rate of such motion produced by one cam may be different, however, from that produced by the other.

The mechanism of Figs. 41 and 42 has a further use in the production of gears for transmitting non-uniform motion, such as gears of the varying-leverage type. The variation in motion produced by the roller-type mechanism of Figs. 28 to 37 is limited. Cams 720 and 721 can be shaped to an infinite variety of contours and hence can produce any desired motion.

While several different embodiments of the invention have been described, it will be understood that the invention is capable of still further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. In a machine for generating gears, a work support, a work spindle journaled in the work support, a tool support, a face-mill gear cutter journaled in the tool support, means for rotating the cutter on its axis, means for effecting alternate forward and return rolling movements between the cutter and work support to generate the tooth profiles, separate means for automatically changing the radial position of the cutter about the axis of roll between the forward and return rolls and for resetting said cutter to original radial position at the end of the return roll, separate means for automatically changing the angular position of the cutter about the axis of the roll between the forward and return rolls and for resetting the cutter to original angular position at the end of the return roll, and means for periodically indexing the work spindle.

2. In a machine for generating gears, a work support, a work spindle journaled in the work support, an oscillatory cradle, a carrier rotatably mounted in the cradle for movement about an axis eccentric of the axis of the cradle, a face-mill gear cutter journaled in the carrier for rotation about an axis eccentric of the axis of the carrier, means for rotating said cutter, means for rotating the cradle and work spindle in timed relation alternately in opposite directions to effect forward and return generating movements, means for moving the carrier on its axis at the end of each forward generating movement to change the position of the cutter radially of the cradle axis and for resetting the carrier to initial position at the end of each return generating movement, means for moving the cradle on its axis independently of its generating movement at the end of each forward generating movement to change the angular position of the cutter about the cradle axis and for resetting the cradle to initial position at the end of each return generating movement, and means for periodically indexing the work spindle.

3. In a machine for generating gears, a work support, a work spindle journaled in the work support, a tool support, a face-mill gear cutter journaled in the tool support, means for rotating the cutter, means for effecting alternate forward and return rolling movements between the cutter and work support to generate the tooth profiles, means for changing the position of the cutter relative to the axis about which the rolling movements take place between the forward and return rolls and for resetting the cutter to original position again at the end of each return roll, and means for stopping the ensuing rolling movement if the shift in position of the cutter has not been completed at the end of the roll in one direction before cutting on the reverse roll begins.

4. In a machine for generating gears, a work support, a work spindle journaled in the work support, a tool support, a face-mill gear cutter journaled in the tool support, means for rotating the cutter, means for effecting alternate forward and return rolling movements between the cutter and work support to generate the tooth profiles, means for changing the radial and angular positions of the cutter about the axis of the generating movement between forward and return rolls and for sesetting the cutter to initial position at the end of each return roll, and means for preventing change in radial position of the cutter at both ends of the roll until after change in the angular position of the cutter about the axis of roll has been completed.

5. In a machine for generating gears, a work support, a work spindle journaled in the work support, a tool support, a face-mill gear cutter journaled in the tool support, means for rotating the cutter, means for effecting alternate forward and return rolling movements between the cutter and work support to generate the tooth profiles, means for changing the radial and angular positions of the cutter about the axis of roll between the forward and return rolls and for resetting the cutter again at the end of the return roll, means for preventing change in the radial position of the cutter at both ends of the roll until after change in angular position of the cutter about the axis of the roll has been completed, and means for preventing roll in the opposite direction if both changes in the position of the cutter have not been completed before the reversal in direction of roll should in normal operation of the machine take place.

6. In a machine for generating gears, a work support, a work spindle journaled in the work support, an oscillatory cradle, a carrier rotatably mounted in the cradle for movement about an axis eccentric of the axis of the cradle, a face-mill gear cutter journaled in the carrier for rotation about an axis eccentric of the axis of the carrier, means for rotating said cutter, means for rotating the cradle and work spindle in timed relation alternately in opposite directions to effect forward and return generating movements, fluid pressure operated means for moving the carrier on its axis at opposite ends of the generating movement to change the position of the cutter radially of the cradle axis and reset the cutter again, respectively, fluid pressure operated means for moving the cradle in opposite directions on its axis independently of its generating movement at opposite ends of the generating movement to change the angular position of the cutter about the axis of the cradle and reset the cutter again, respectively, and a valve controlled by the second named fluid pressure operated means in its operation for preventing operation of the first named fluid pressure operated means at both ends of the roll until the second named fluid pressure operated means has completed its operation.

7. In a machine for generating gears, a work support, a work spindle journaled in the work support, a tool support, a face-mill gear cutter journaled in the tool support, an oscillatory cradle on which one of said supports is mounted, means for rotating the cutter on its axis, means for rotating the cradle and work support in timed relation alternately in opposite directions to effect forward and return generating movements, means for controlling said generating movements so that the ratio of the cradle and work spindle rotations is different during the roll in one direction from that during the roll in the opposite direction, and means for changing the position of the cutter radially and angularly of the axis of the rolling movement between rolls in opposite directions.

8. In a machine for producing gears, a work support, a work spindle journaled in the work support, an oscillatory member, a carrier movably mounted on said member, a face-mill gear cutter journaled in said carrier, means for rotating the cutter, means for rotating the oscillatory member and work support in timed relation alternately in opposite directions to effect the forward and return generating rolls and means for moving said oscillatory member independently of the generating movement between the forward and return rolls and for resetting the oscillatory member to initial position at the end of the return roll, separate means for moving the carrier in one direction independently of the cradle at the end of the forward roll and for resetting the carrier to initial position at the end of the return roll and means for periodically indexing the work spindle.

9. In a machine for generating gears, a work support, a work spindle journaled in the work support, a tool support, a face-mill gear cutter journaled in the tool support, an oscillatory cradle on which one of said supports is mounted, means for rotating the cutter on its axis, means for rotating the cradle and work spindle in timed relation alternately in opposite directions to effect forward and return generating movements, means for varying the ratio of the cradle and work spindle movements during both forward and return rolls, means for controlling said generating movements so that the ratio of cradle and work spindle rotations is different during roll in opposite directions, means for changing the position of the cutter radially and angularly of the axis of roll between the generating movements in opposite directions, and means for periodically indexing the work spindle.

10. In a machine for generating gears, a work support, a work spindle journaled in the work support, a tool support, a face-mill gear cutter journaled in the tool support, means for rotating the work spindle alternately in opposite directions, means for rotating the cradle alternately in opposite directions in time with the rotation of the work spindle to effect forward and return generating movements comprising a worm wheel secured to the cradle and a worm meshing therewith, means for moving the worm axially in opposite directions at opposite ends of the generating movement to effect angular shift of the cutter relative to the work and resetting of the cutter, respectively, means for moving the tool support in opposite directions at opposite ends of the generating movement to effect radial shift of the cutter relative to the work and resetting of the cutter, respectively, and means for periodically indexing the work spindle.

11. In a machine for generating gears, a work support, a work spindle journaled in the work support, a tool support, a face-mill gear cutter journaled in the tool support, means for rotating the work spindle alternately in opposite directions, means for rotating the cradle alternately in opposite directions in time with the rotation of the work spindle to effect forward and return generating movements comprising a worm wheel secured to the cradle, a worm meshing therewith, means for moving the worm axially in opposite directions at opposite ends of the generating movement to effect angular shift of the cutter relative to the work and resetting of the cutter, respectively, means for moving the tool support in opposite directions at opposite ends of the generating movement to effect radial shift of the cutter relative to the work and resetting of the cutter, respectively, separate means for moving the worm axially during roll in both directions to vary the ratio of roll, and means for periodically indexing the work spindle.

12. In a machine for generating gears, a work support, a work spindle journaled in the work support, a tool support, a face-mill gear cutter journaled in the tool support, means for rotating the work spindle alternately in opposite directions, means for rotating the cradle alternately in opposite directions in time with the rotation of the work spindle to effect forward and return generating movements comprising a worm wheel secured to the cradle and a worm meshing therewith, a piston connected to said worm, a cylinder in which said piston reciprocates, means for admitting fluid under pressure alternately to opposite ends of the cylinder at opposite ends of the generating movement, respectively, to effect angular shift of the cutter relative to the work and resetting of the cutter, respectively, fluid pressure operated means comprising a cylinder and a piston reciprocable therein for moving the tool support at opposite ends of the generating movement, respectively, to effect radial shift of the cutter relative to the work and resetting of the cutter, respectively, a valve controlling the operation of the last named means, and means operatively connecting said valve with the first named piston whereby the flow of the pressure fluid is shut off to the second piston during movement of the first named piston at the ends of the generating movement, and means for periodically indexing the work spindle.

13. In a machine for generating gears, a work support, a work spindle journaled in the work support, a tool support, a face-mill gear cutter journaled in the tool support, means for rotating the cutter on its axis, means for effecting alternate forward and return rolling movements between the cutter and work support to generate the tooth profiles, means including an electric motor for driving said two first named means, means for changing the radial and angular positions of the cutter about the axis of roll between the forward and return generating movements and for resetting the cutter to original position at the end of each return generating movement, and a pair of normally open limit switches incorporated in the starting circuit to said motor, one of which must be closed to maintain said circuit, means for closing one of said switches for a predetermined period of time during the shift of the cutter, and means operable at the ends of the shifting movement to hold the other switch closed during cutting if said shift is effected in said predetermined period.

14. In a machine for generating gears, a work support, a work spindle journaled in the work support, a tool support, a face-mill gear cutter journaled in the tool support, means for rotating the cutter on its axis, means for effecting a relative rolling movement between the cutter and work support alternately in opposite directions to effect forward and return generating movements, means including an electric motor for driving said first two named means, means for changing the radial and angular positions of the cutter about the axis of roll between the forward and return generating movements and for resetting the cutter to original position at the end of each return generating movement, a trio of normally open limit switches incorporated in the starting circuit to said motor, one of which must be closed to maintain the starting circuit during shift of the cutter and the other two of which must be closed to maintain the starting circuit during cutting, means for closing the first named switch for a predetermined time during shift of the cutter, and means operable at the end of the radial movement of the cutter to close one of the other switches and hold it closed during cutting, and means operable at the ends of the angular movement of the cutter to close the third switch and hold it closed during cutting.

15. In a machine for generating gears, a work support, a work spindle journaled in the work support, a tool support, a face-mill gear cutter journaled in the tool support, means for rotating the cutter on its axis, means for effecting a relative rolling movement between the cutter and work support alternately in opposite directions to effect forward and return generating movements, means for changing the radial and angular positions of the cutter about the axis of roll between the forward and return generating movements and for resetting the cutter to original position again at the end of each return generating movement, means for varying the ratio of roll during both forward and return movements, means for controlling the generating movements so that the ratio of roll is different during the return roll from that during the forward roll, drives to the last two named means which are disconnectable, and means for rendering the mechanism for changing the radial position of the cutter inoperative.

16. In a machine for generating gears, a work support, a work spindle journaled in the work support, an oscillatory cradle, a carrier rotatably mounted in the cradle for movement about an axis eccentric of the axis of the cradle, a face-mill gear cutter journaled in the carrier eccentrically of the axis of the carrier, means for rotating the cradle and work spindle alternately in opposite directions to effect forward and return generating movements, means for moving the cradle and carrier on their respective axes at opposite ends of the generating movement, respectively, to change the position of the cutter and to reset the cutter, respectively, means for controlling the direction of relative movements of the cradle and carrier so that they may selectively move in the same direction or in opposite directions at each end of the roll, and means for periodically indexing the work spindle.

17. In a machine for generating gears, a work support, a work spindle journaled in the work support, a tool support, a face-mill gear cutter journaled in the tool support, an oscillatory cradle on which one of said supports is mounted, means for rotating the cutter, means for rotating the work spindle, means for rotating the cradle in time with the rotation of the work spindle comprising a worm wheel secured to the cradle and a worm meshing therewith, a pair of cams for moving said worm axially during generation, means for rotating said cams in time with the rotation of the worm, and means for moving one of the cams out of operative relation with said worm and the other cam into operative relation therewith at opposite ends of the roll.

18. In a machine for generating gears, a work support, a work spindle journaled in the work support, an oscillatory cradle, a tool support movably mounted on the cradle, a face-mill gear cutter journaled in the tool support, means for rotating the cutter, means for rotating the work spindle, means for rotating the cradle in time with the rotation of the work spindle comprising a worm wheel secured to the cradle and a worm meshing therewith, means for rotating the worm in time with the rotation of the work spindle, a rotary plate, a pair of rollers mounted on the plate in angularly spaced relation about the axis of rotation of the plate, a pair of followers adapted to engage, respectively, with the two rollers, means operatively connecting the followers with the worm, means for driving the plate in time with the rotation of the worm, means for alternately rotating the worm and work spindle in opposite directions to effect forward and return generating rolls, means for shifting the tool support in opposite directions at opposite ends of the roll, means for shifting the worm axially at opposite ends of the roll to move one of the followers out of operative relation with one roller and the other follower into operative relation with the other roller, and means for periodically indexing the work spindle.

19. In a machine for generating gears, a work support, a work spindle journaled in the work support, a tool support, a face-mill gear cutter journaled in the tool support, means for rotating the cutter on its axis, means for effecting a relative rolling movement between the cutter and work support alternately in opposite directions to effect forward and return generating movements, means for changing the radial position of the cutter relative to the work between the forward and return rolls and for resetting the cutter radially to original position after each return roll, separate means for changing the angular position of the cutter relative to the work between the forward and return rolls and for resetting the cutter angularly to original position after each return roll, means for varying the ratio of roll between the cutter and work, and means for periodically indexing the work spindle.

20. In a machine for generating gears, a work support, a work spindle journaled in the work support, a tool support, a face-mill cutter journaled in the tool support, means for rotating the cutter on its axis, means for effecting a relative rolling movement between the tool and work supports alternately in opposite directions to effect forward and return generating movements, means for shifting the position of the tool support relative to the axis of roll between the forward and return generating movements and for resetting the tool support to original position at the end of each return generating movement, means incorporated in the drive to the means for effecting the roll which must be in operative position to maintain said drive, means continuously urging said maintaining means to inoperative position, means connected to the tool support and operable to hold said maintaining means in operative position when the tool support is in operative position at either end of its shift, said last named means being movable with the tool support during shifting so as to permit movement of the maintaining means to inoperative position during shifting, and separate means driven in time with the roll-effecting means to maintain the drive to said roll-effecting means for a predetermined period of time during each shift of the tool support, whereby the roll will continue if said shift is completed in said predetermined period but will stop if the shift is not completed in said period.

21. In a machine for generating gears, a work support, a work spindle journaled in the work support, a tool support, a face mill cutter journaled in the tool support, means for rotating the cutter on its axis, means for effecting a relative rolling movement between the tool and work supports alternately in opposite directions to effect forward and return generating movements, separate means for shifting the tool support both radially and angularly of the axis of roll between the forward and return generating movements and for resetting the tool support to original position at the end of each return generating movement, said last named means being interlocked so that angular shift of the tool support must be completed before radial shift can begin, means incorporated in the drive to the means for effecting the roll which must be in operative position to maintain said drive, means continuously urging said maintaining means to inoperative position, means connected to the tool support and operable to hold said maintaining means in operative position when the tool support is in operating position at either end of its shift, said last named means being movable with the tool support during shift of the tool support so as to permit movement of the maintaining means to inoperative position during said shift, and separate means driven in time with the roll-effecting means to maintain the drive to said roll-effecting means for a predetermined period of time during each shift of the tool support, whereby the roll will continue if said shift is completed in said predetermined period but will stop if the shift is not completed in said period.

22. In a machine for generating gears, a work support, a work spindle journaled in the work support, a tool support, a face mill gear cutter journaled in the tool support, means for rotating the cutter on its axis, means for effecting a relative rolling movement between the cutter and work support alternately in opposite directions to effect forward and return generating movements, means including an electric motor for driving said last named means, means for changing the radial and angular positions of the cutter about the axis of roll between the forward and return generating movements and for resetting the cutter to original position at the end of each return generating movement, a trio of normally open limit switches incorporated in the starting circuit to said motor, one of which must be closed to maintain the circuit during shift of the cutter and the other two of which must be closed to maintain the circuit during cutting, means driven in time with the roll-effecting means for closing the first-named switch for a predetermined time during shift of the cutter, and means operable at the end of the radial movement of the cutter to close one of the other switches and hold it closed during cutting, and means operable at the end of the angular movement of the cutter to close the third switch and hold it closed during cutting.

LEONARD O. CARLSEN.
OLAF A. JOHNSON.